United States Patent
Calman et al.

(10) Patent No.: US 8,721,337 B2
(45) Date of Patent: May 13, 2014

(54) REAL-TIME VIDEO IMAGE ANALYSIS FOR PROVIDING VIRTUAL LANDSCAPING

(75) Inventors: Matthew A. Calman, Charlotte, NC (US); Erik Stephen Ross, Charlotte, NC (US)

(73) Assignee: Bank Of America Corporation, Charlotte, NC (US)

( * ) Notice: Subject to any disclaimer, the term of this patent is extended or adjusted under 35 U.S.C. 154(b) by 112 days.

(21) Appl. No.: 13/342,065

(22) Filed: Jan. 1, 2012

(65) Prior Publication Data

US 2012/0231425 A1    Sep. 13, 2012

Related U.S. Application Data

(60) Provisional application No. 61/450,213, filed on Mar. 8, 2011, provisional application No. 61/508,966, filed on Jul. 18, 2011.

(51) Int. Cl.
*G09B 25/08* (2006.01)
*G09B 11/00* (2006.01)

(52) U.S. Cl.
USPC ............................................. 434/93; 434/82

(58) Field of Classification Search
CPC ................................. G09B 25/00; G09B 25/08
USPC ............................................... 434/72, 81, 93
See application file for complete search history.

(56) References Cited

U.S. PATENT DOCUMENTS

| | | | |
|---|---|---|---|
| 5,768,633 A | 6/1998 | Allen et al. | |
| 6,202,055 B1 | 3/2001 | Houvener et al. | |
| 6,522,772 B1 | 2/2003 | Morrison et al. | |
| 6,533,392 B1 | 3/2003 | Koitabashi | |
| 6,636,249 B1 | 10/2003 | Rekimoto | |
| 6,674,993 B1 | 1/2004 | Tarbouriech | |
| 6,856,965 B1 | 2/2005 | Stinson et al. | |

(Continued)

FOREIGN PATENT DOCUMENTS

| | | |
|---|---|---|
| JP | 2007-266143 | 10/2007 |
| KR | 1020090047614 A | 5/2009 |
| KR | 1020090105734 A | 10/2009 |

OTHER PUBLICATIONS

International Search Report and Written Opinion dated Oct. 12, 2012 for International Application No. PCT/US1248697.

(Continued)

*Primary Examiner* — Kesha Frisby
(74) *Attorney, Agent, or Firm* — Michael A. Springs; Moore & Van Allen, PLLC; Nicholas C. Russell

(57) ABSTRACT

System, method, and computer program product are provided for using real-time video analysis, such as AR or the like to assist the user of mobile devices with landscape design. Through the use of real-time vision object recognition objects, logos, artwork, products, locations, and other features that can be recognized in the real-time video stream can be matched to data associated with such to assist the user with selecting the proper landscape elements for the area the user wishes to landscape. The proper landscape elements may be based off of several factors regarding the landscape area. These factors include natural characteristics of the area, such as soil type, weather, sun/shade, natural terrain of the area, etc. This invention provides recommended landscape elements for an area, such that the recommended landscape elements have a high rate of success in the area.

34 Claims, 7 Drawing Sheets

(56) References Cited

U.S. PATENT DOCUMENTS

| | | | |
|---|---|---|---|
| 7,016,532 | B2 | 3/2006 | Boncyk et al. |
| 7,062,454 | B1 | 6/2006 | Giannini et al. |
| 7,110,964 | B2 | 9/2006 | Tengler et al. |
| 7,154,529 | B2 | 12/2006 | Hoke et al. |
| 7,155,228 | B2 | 12/2006 | Rappaport et al. |
| 7,309,015 | B2 | 12/2007 | Frantz et al. |
| 7,403,652 | B2 | 7/2008 | Boncyk et al. |
| 7,412,081 | B2 | 8/2008 | Doi |
| 7,424,303 | B2 | 9/2008 | Al-Sarawi |
| 7,477,780 | B2 | 1/2009 | Boncyk et al. |
| 7,526,280 | B2 | 4/2009 | Jung et al. |
| 7,564,469 | B2 | 7/2009 | Cohen |
| 7,565,008 | B2 | 7/2009 | Boncyk et al. |
| 7,615,446 | B2 | 11/2009 | Kim et al. |
| 7,634,448 | B1 | 12/2009 | Ramachandran |
| 7,680,324 | B2 | 3/2010 | Boncyk et al. |
| 7,693,585 | B2 | 4/2010 | Kalan et al. |
| 7,735,728 | B2 | 6/2010 | Wallerstorfer |
| 7,775,437 | B2 | 8/2010 | Cohen |
| 7,792,738 | B2 | 9/2010 | Channell |
| 7,840,031 | B2 | 11/2010 | Albertson et al. |
| 7,881,243 | B2 | 2/2011 | Hardy et al. |
| 7,881,529 | B2 | 2/2011 | Boncyk et al. |
| 7,899,243 | B2 | 3/2011 | Boncyk et al. |
| 7,899,252 | B2 | 3/2011 | Boncyk et al. |
| 7,962,128 | B2 | 6/2011 | Neven et al. |
| 7,970,649 | B2 | 6/2011 | Wu |
| 7,983,971 | B1 | 7/2011 | McLuckie et al. |
| 7,988,060 | B2 | 8/2011 | Killian et al. |
| 8,121,944 | B2 | 2/2012 | Norman et al. |
| 8,138,930 | B1 | 3/2012 | Heath |
| 8,145,594 | B2 | 3/2012 | Geisner et al. |
| 8,154,428 | B2 | 4/2012 | Do et al. |
| 8,180,377 | B2 * | 5/2012 | Yang et al. ................. 455/456.3 |
| 8,233,673 | B2 | 7/2012 | Britz et al. |
| 8,385,971 | B2 | 2/2013 | Rhoads et al. |
| 8,392,450 | B2 | 3/2013 | Blanchflower et al. |
| 8,438,110 | B2 | 5/2013 | Calman et al. |
| 8,571,888 | B2 | 10/2013 | Calman et al. |
| 2002/0124188 | A1 | 9/2002 | Sherman et al. |
| 2003/0064705 | A1 | 4/2003 | Desiderio |
| 2004/0021584 | A1 | 2/2004 | Hartz, Jr. et al. |
| 2004/0024709 | A1 | 2/2004 | Yu et al. |
| 2005/0162523 | A1 | 7/2005 | Darrell et al. |
| 2006/0100951 | A1 | 5/2006 | Mylet et al. |
| 2007/0140595 | A1 | 6/2007 | Taylor et al. |
| 2007/0162971 | A1 | 7/2007 | Blom et al. |
| 2007/0279521 | A1 | 12/2007 | Cohen |
| 2008/0040278 | A1 | 2/2008 | DeWitt |
| 2008/0070198 | A1 * | 3/2008 | Dempsey ........................ 434/72 |
| 2008/0214210 | A1 | 9/2008 | Rasanen et al. |
| 2008/0243721 | A1 | 10/2008 | Joao |
| 2008/0267447 | A1 | 10/2008 | Kelusky et al. |
| 2008/0268876 | A1 | 10/2008 | Gelfand et al. |
| 2009/0006191 | A1 | 1/2009 | Arankalle et al. |
| 2009/0061949 | A1 | 3/2009 | Chen |
| 2009/0089131 | A1 | 4/2009 | Moukas et al. |
| 2009/0094125 | A1 | 4/2009 | Killian et al. |
| 2009/0102859 | A1 | 4/2009 | Athsani et al. |
| 2009/0121271 | A1 | 5/2009 | Son et al. |
| 2009/0140839 | A1 | 6/2009 | Bishop et al. |
| 2009/0144164 | A1 | 6/2009 | Wane et al. |
| 2009/0171850 | A1 | 7/2009 | Yuval |
| 2009/0182748 | A1 | 7/2009 | Walker |
| 2009/0204511 | A1 | 8/2009 | Tsang |
| 2009/0237546 | A1 | 9/2009 | Bloebaum et al. |
| 2009/0250515 | A1 | 10/2009 | Todd et al. |
| 2009/0251963 | A1 | 10/2009 | Seol et al. |
| 2010/0002204 | A1 | 1/2010 | Jung et al. |
| 2010/0130226 | A1 | 5/2010 | Arrasvuori et al. |
| 2010/0185529 | A1 | 7/2010 | Chesnut et al. |
| 2010/0228776 | A1 | 9/2010 | Melkote et al. |
| 2010/0250581 | A1 | 9/2010 | Chau |
| 2010/0255795 | A1 | 10/2010 | Rubinsky et al. |
| 2010/0277412 | A1 | 11/2010 | Pryor |
| 2010/0281432 | A1 | 11/2010 | Geisner et al. |
| 2010/0306712 | A1 | 12/2010 | Snook et al. |
| 2010/0306715 | A1 | 12/2010 | Geisner et al. |
| 2011/0022540 | A1 | 1/2011 | Stern et al. |
| 2011/0034176 | A1 | 2/2011 | Lord et al. |
| 2011/0077046 | A1 | 3/2011 | Durand et al. |
| 2011/0079639 | A1 | 4/2011 | Khan |
| 2011/0106622 | A1 | 5/2011 | Kuhlman et al. |
| 2011/0119155 | A1 | 5/2011 | Hammad et al. |
| 2011/0202460 | A1 | 8/2011 | Buer et al. |
| 2011/0202466 | A1 | 8/2011 | Carter |
| 2012/0100915 | A1 | 4/2012 | Margalit et al. |
| 2012/0330753 | A1 * | 12/2012 | Urbanski et al. ........... 705/14.58 |
| 2013/0011111 | A1 | 1/2013 | Abraham et al. |

OTHER PUBLICATIONS

International Search Report and Written Opinion for International Application No. PCT/US12/27890 mailed Feb. 5, 2013.

PCT International Search Report and Written Opinion for International Application No. PCT/US 12/28008 dated May 22, 2012.

PCT International Search Report and Written Opinion for International Application No. PCT/US 12/28036 dated May 28, 2012.

PCT International Search Report and Written Opinion for International Application No. PCT/US2012/027912 dated Jun. 8, 2012.

PCT International Search Report and Written Opinion for International Application No. PCT/US 12/27892 dated Jun. 14, 2012.

M.J. Welch (2010). Addressing the Challenges in Underspecification in Web Search. (Order No. 3446833, University of California, Los Angeles). ProQuest Dissertations and Theses; 137; retrieved from http://search.proquest.com/docview/858101500?accountid=14753. (858101500).

K.J. Jeevan & P. Padhi (2006). A Selective Review of Research in Content Personalization. Library Review, 55(9), 556-586. doi:http://dx.doi.org/10.1108/00242530610706761.

P.A. Lessner (2007). Chi-thinking: Chiasmus and Cognition. (Order No. 3297307, University of Maryland, College Park). ProQuest Disserations and Theses; 487; retrieved from http://search.proquest.com/docview/304851937?accountid=14753. (304851937).

International Preliminary Examination Report for International Application No. PCT/US12/27892 dated Sep. 10, 2013; 9 pages.

International Preliminary Examination Report for International Application No. PCT/US2012/027890 dated Sep. 10, 2013; 6 pages.

International Preliminary Examination Report for International Application No. PCT/US12/28036 dated Sep. 10, 2013; 5 pages.

International Preliminary Examination Report for International Application No. PCT/US12/28008 dated Sep. 10, 2013; 7 pages.

International Preliminary Examination Report for International Application No. PCT/US12/27912 dated Sep. 10, 2013; 6 pages.

* cited by examiner

REAL-TIME VIDEO IMAGE ANALYSIS FOR PROVIDING VIRTUAL LANDSCAPING

CLAIM OF PRIORITY UNDER 35 U.S.C. §119

This Non-provisional patent application claims priority to U.S. Provisional Patent Application Ser. No. 61/450,213, filed Mar. 8, 2011, entitled "Real-Time Video Image Analysis Applications for Commerce Activity," and U.S. Provisional Patent Application Ser. No. 61/508,966 titled "Real-Time Video Image Analysis for Providing Virtual Landscaping" filed on Jul. 18, 2011, assigned to the assignee hereof and hereby expressly incorporated by reference herein.

BACKGROUND

Land owners have many options when it comes to landscaping their property. Land owners may add grasses, plants, flowers, bushes, trees, rocks, yard gnomes, mulch, and/or the like to their land to enhance the look of their land and add value to their property. Furthermore, many land owners add hardscapes, such as pools, decks, furniture, or the like for outdoor entertainment purposes. Selecting and positioning these landscape elements is a difficult task for most land owners. In fact, many land owners turn to professional landscapers to determine recommended landscape elements to add and the location to add them.

Many factors may play a role in landscape design. For example, plants, grasses, flowers, bushes, trees, and other living landscape elements require proper water, sunlight, and soil conditions to grow. And, these criteria vary widely by plant species. Even with advances in technology, knowing the best landscape elements for a specific piece of property may be a challenging task.

Today, modern handheld mobile devices, such as smart phones or the like, have the capability to facilitate payment for a cup of coffee or provide a boarding pass for a flight. These advances combine multiple technologies through a handheld mobile device to provide a user with an array of capabilities. For example, many smart phones are equipped with significant processing power, sophisticated multi-tasking operating systems, and high-bandwidth Internet connection capabilities. Moreover, such mobile devices often have additional features that are becoming increasingly more common and standardized features. Such features include, but are not limited to, location-determining devices, such as Global Positioning System (GPS) devices; sensor devices, such as accelerometers; and high-resolution video cameras.

As the capabilities of such mobile devices have increased, so too have the applications (i.e., software) that can be used with the mobile devices. One such example of innovative software is a category known as augmented reality ("AR"), or more generally referred to as mediated reality. One such example of an AR presentment application platform is Layar, available from Layar, Amsterdam, the Netherlands. The Layar platform technology analyzes location data, compass direction data, and the like in combination with information related to the objects, locations or the like in a captured video stream to create browse-able "hot-spots" or "tags" that are superimposed on the mobile device display, resulting in an experience described as "reality browsing."

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for using real-time video analysis, such as AR or the like to assist the user of mobile devices with landscaping a defined landscaping area.

Using real-time video analysis, such as augmented reality or the like the user may capture information regarding a defined landscape area, such as the user's property around his house. The system reviews the captured information and provides the user of the mobile device with virtual landscape information, such as indications of the proper landscaping elements for the area the user captured in real-time video.

Landscape information may be provided to a user based on an analysis of several factors relating to the captured area. These factors include various information about the selected area to be landscaped, such as the global position, compass position of mobile device capturing the landscape image or video, climate range, rain fall averages, sun/shade, slope/topography, soil type, prevailing winds, dimensional data, existing plant, water and hardscape features, and the like. Other factors may include the selected landscaping style desired, such as formal, informal, Tuscan, Italian, Mediterranean, English garden, tropical, Asian, contemporary, desert, and/or xeriscape styles.

Based on these factors, the system may provide the best location for landscape elements within the defined landscape area. For example, the system may suggest planting a pine tree in the northern portion of the defined area of land, because the northern portion of the land provides the best environment for a pine tree to grow. The user may then select the indicator associated with that landscape element and purchase the element via his/her mobile device.

In some embodiments, the indicator associated with that specific landscape element may also provide other landscape elements suitable for that area. For example, if the user selects the indicator associated with the pine tree in the northern portion of the defined area of land, the system may provide other trees that may be suitable for that area, such as an Oak or Maple tree.

In some embodiments, the user may select a landscape element the system recommended from the real-time video display and move the element to other locations on the display in order to get a visual of the possible positioning of that element within the defined landscape area. The system may then analyze the factors for the location in which the user moved the element to and determine if the landscape element will be suitable for the new, user defined position.

In yet other embodiments, the user may provide an pre-selected landscape elements that he/she wants to have incorporated into the landscape area. The system may then position the landscape elements that the user provides in suitable positions, such that each element may be in the best location for its needs. For example, a user may wish to add a pool and patio furniture to his/her backyard. The system may position the furniture and pool in such a way as to make the pool the focal point of the backyard.

In still other embodiments, the user may be in a store, on the Internet, or in another location where landscape elements may be sold. The user may particularly like a specific element that he/she sees. The user may use real-time video analysis, such as augmented reality or the like to capture information regarding the landscape element. The system may then provide the user with a display incorporating that landscape element into the user's defined landscape area. In this way, the user may visualize the landscape element in his/her landscape area and determine if he/she wishes to purchase the product.

Embodiments of the invention relate to systems, methods, and computer program products for providing landscaping design recommendations comprising: building a directory of data relating to the landscape area, wherein the directory comprises information regarding a location within the landscape area, the information based on natural characteristics of the location within the landscape area; receiving information about a product from a mobile device, wherein the products are to be incorporated in the landscape area; matching the information about the product with the directory of data relating to locations within the landscape area, through the use of a processing device, wherein the matching of the product with the location within the landscape area is based at least in part on the natural characteristics of the location within the landscape area and the natural characteristics of the product; and presenting the products and indicators associated with the products in a real-time video stream on a mobile device, in a recommended location within the landscape area, the recommended location is based at least in part on the matching of information about the product with the directory of data relating to the location within the landscape area.

In some embodiments, presenting the products and indicators associated with the products comprises superimposing the products and indicators associated with the products over real-time video that is capture by the mobile phone of the landscape area, wherein the location of the products within the landscape area correspond to the directory of data relating to the landscape area. Presenting an indicator associated with the product may comprise displaying the indicator on a display of the mobile device. The presenting of an indicator associated with the product comprises superimposing the indicator over real-time video that is captured by the mobile device. The indicator may further be selectable by the user. The indicator, upon being selected, provides information about the product and the natural characteristics of the product compared to the natural characteristics of the location within the landscape area.

In some embodiments, matching the product with the directory of data relating to the landscape area further comprises determining a location for the product within the landscape area, wherein the location for the product within the landscape area is the location the product is going to thrive, based at least in part on the natural characteristics of the product and the landscape area.

In some embodiments, the directory comprises natural characteristic information regarding geographic location indications within the landscape area. The directory may further comprise natural characteristic information about geological information or weather data of the landscape area.

In some embodiments, receiving product information may comprise manually inputted list data, wherein the list data indicates user products preferences. Receiving product information may also comprise real-time imaging of a product.

BRIEF DESCRIPTION OF THE DRAWINGS

Figure 1:
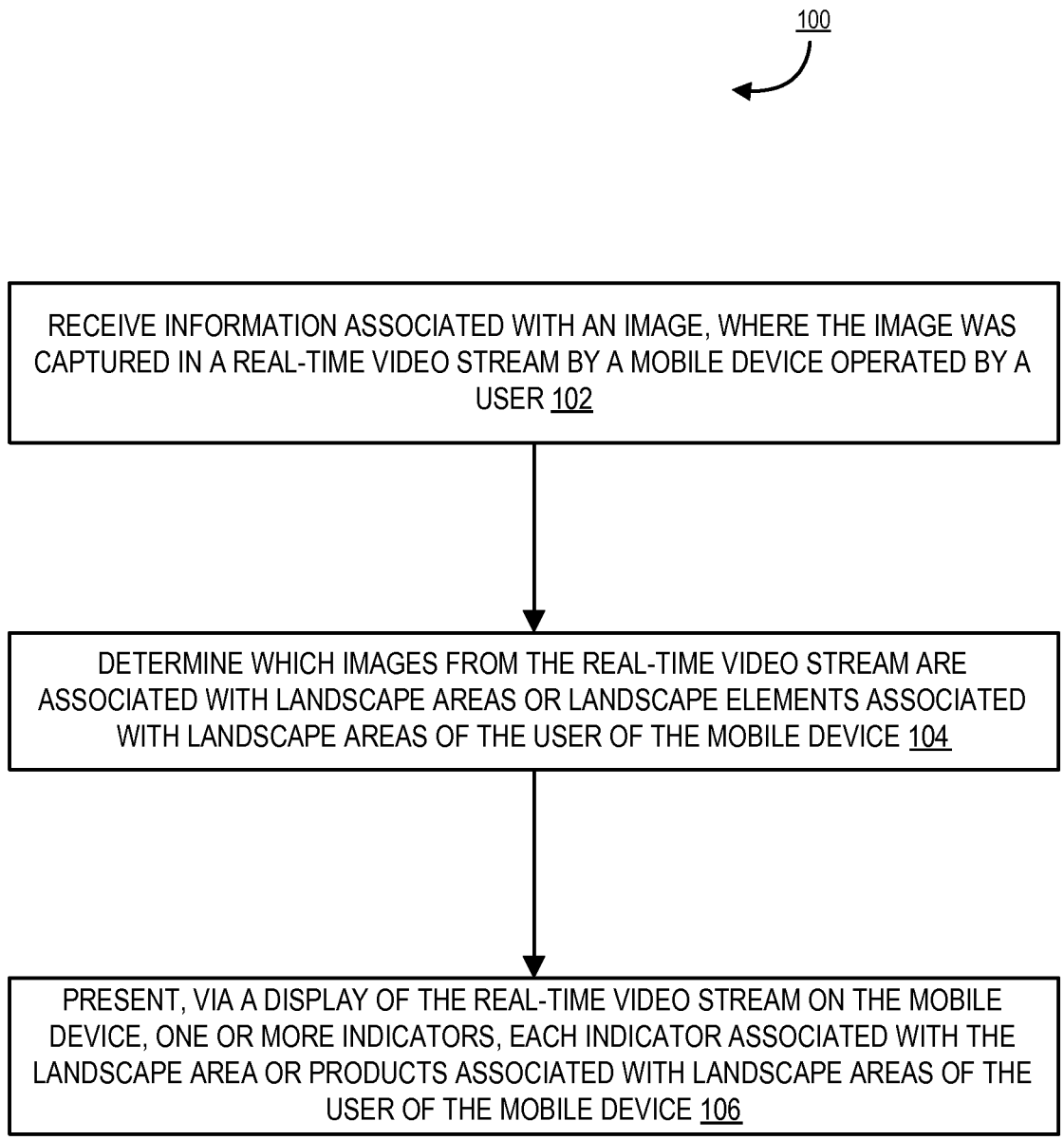
Figure 2:
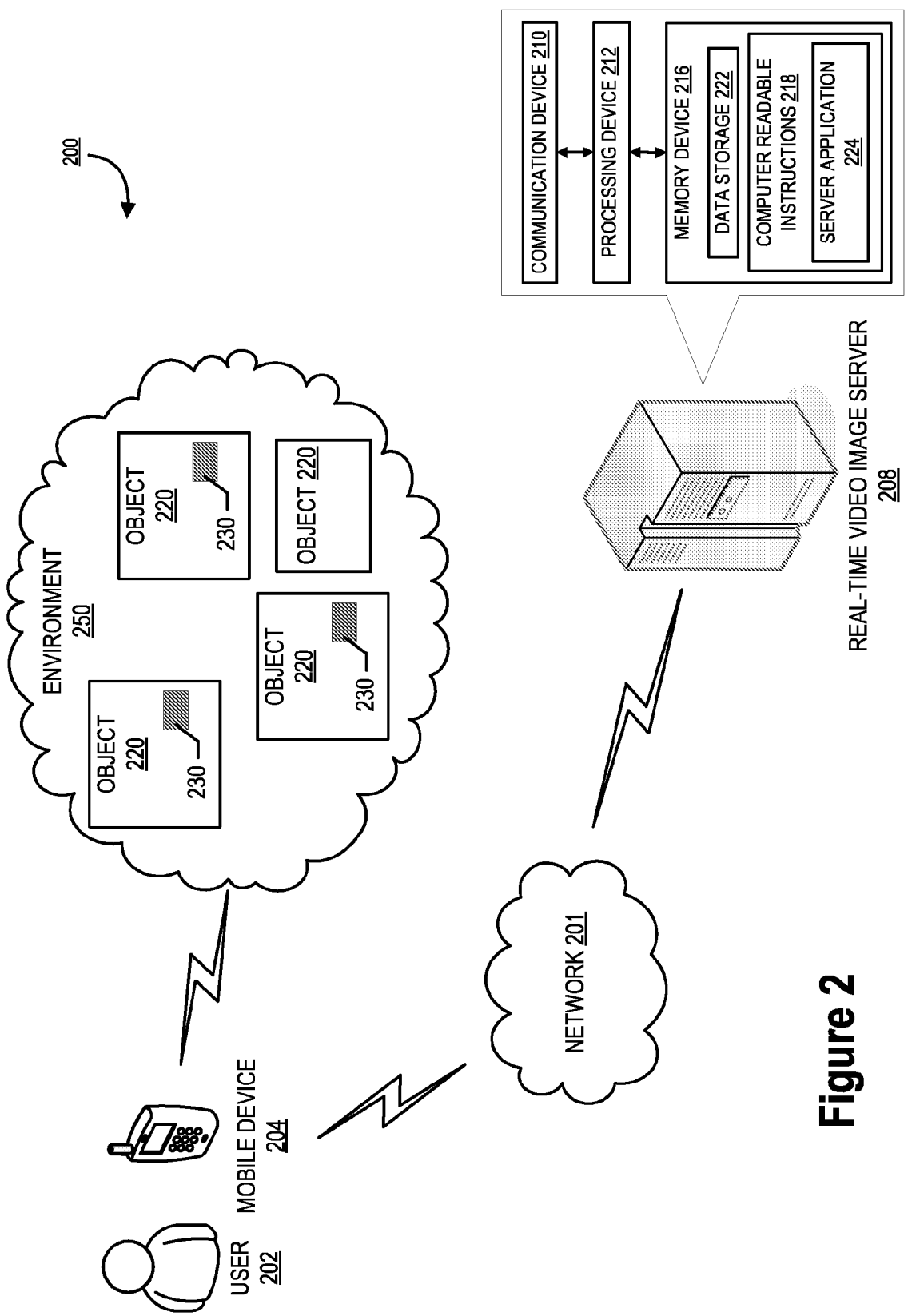
Figure 3:
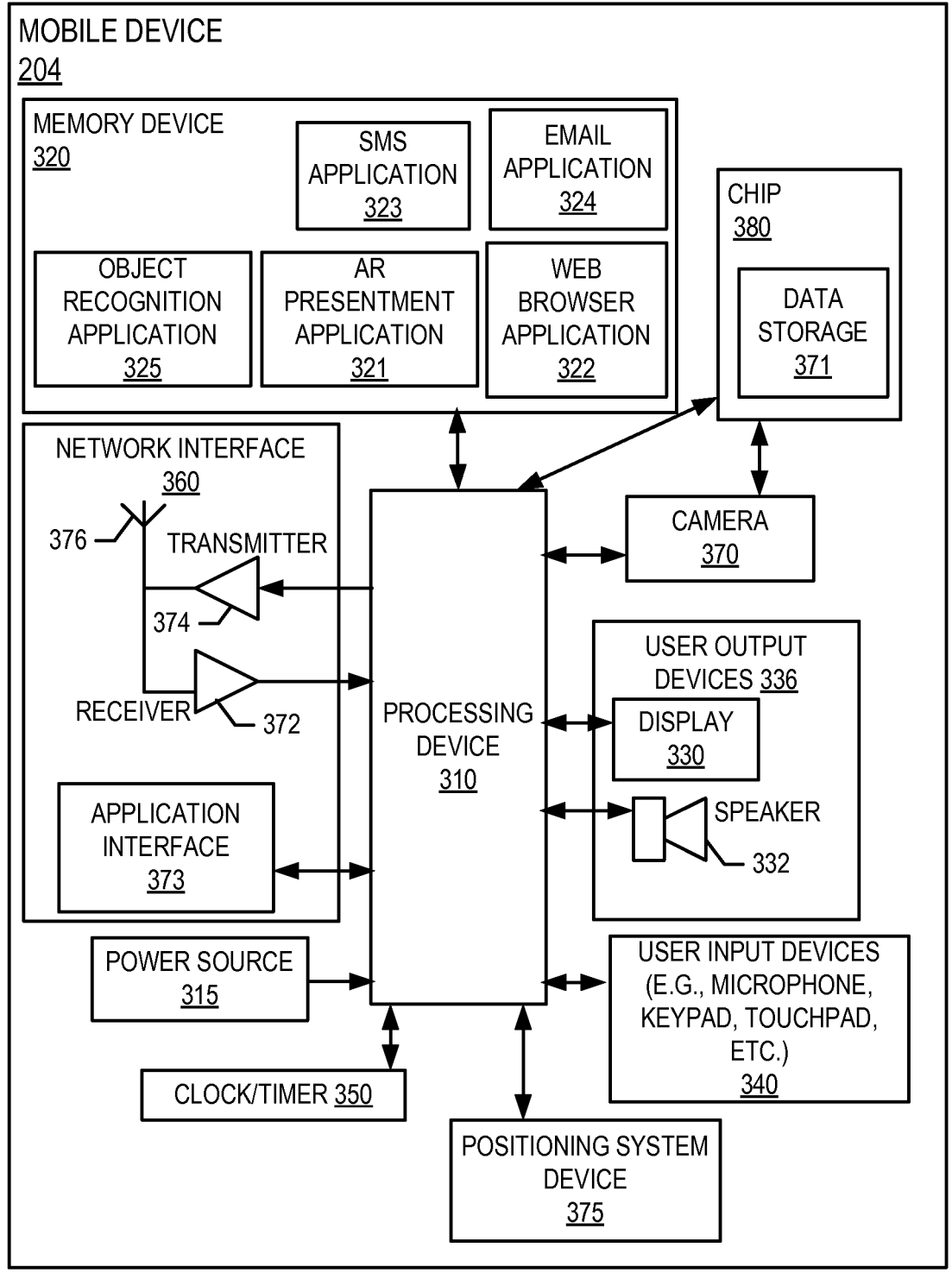
Figure 4:
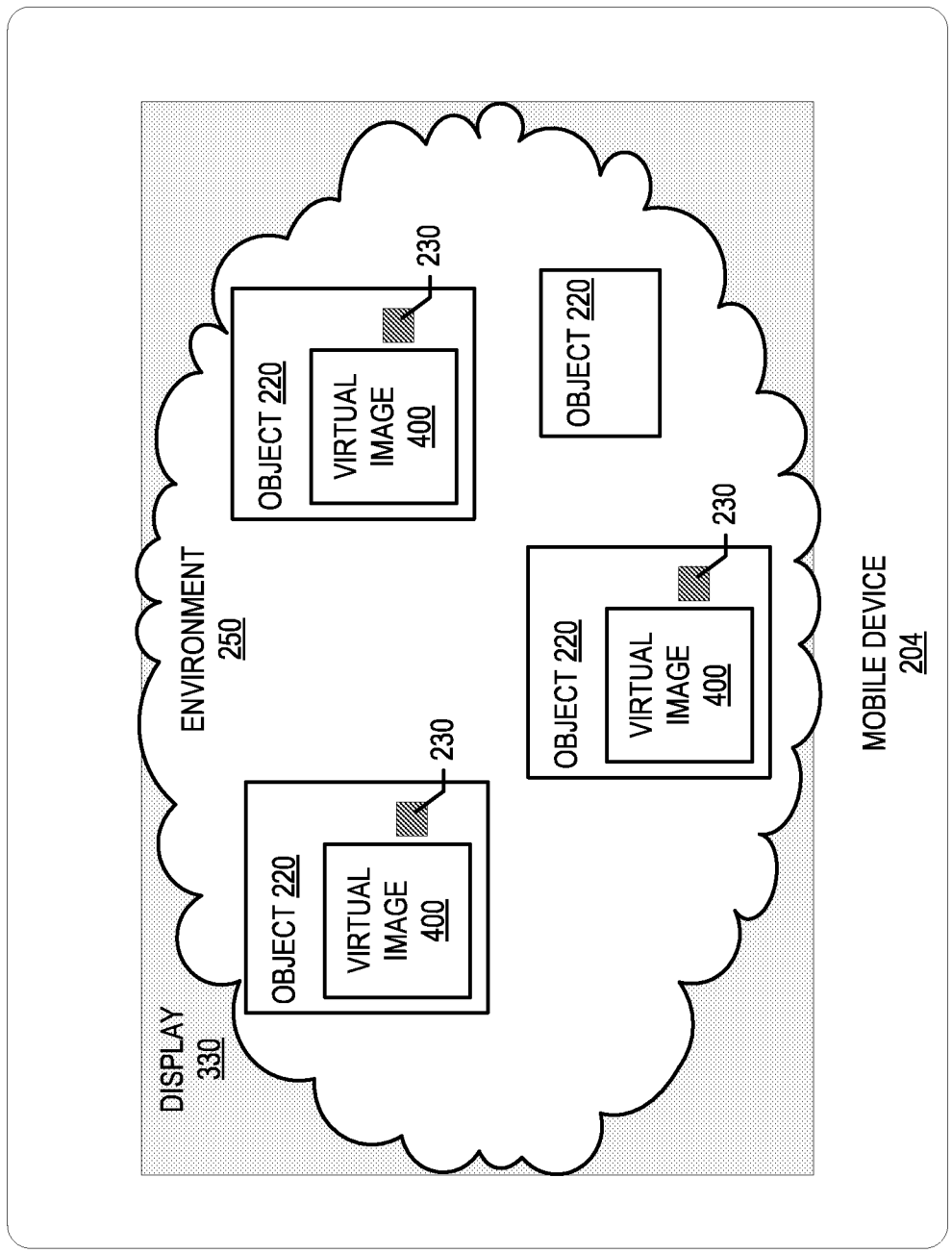
Figure 5:
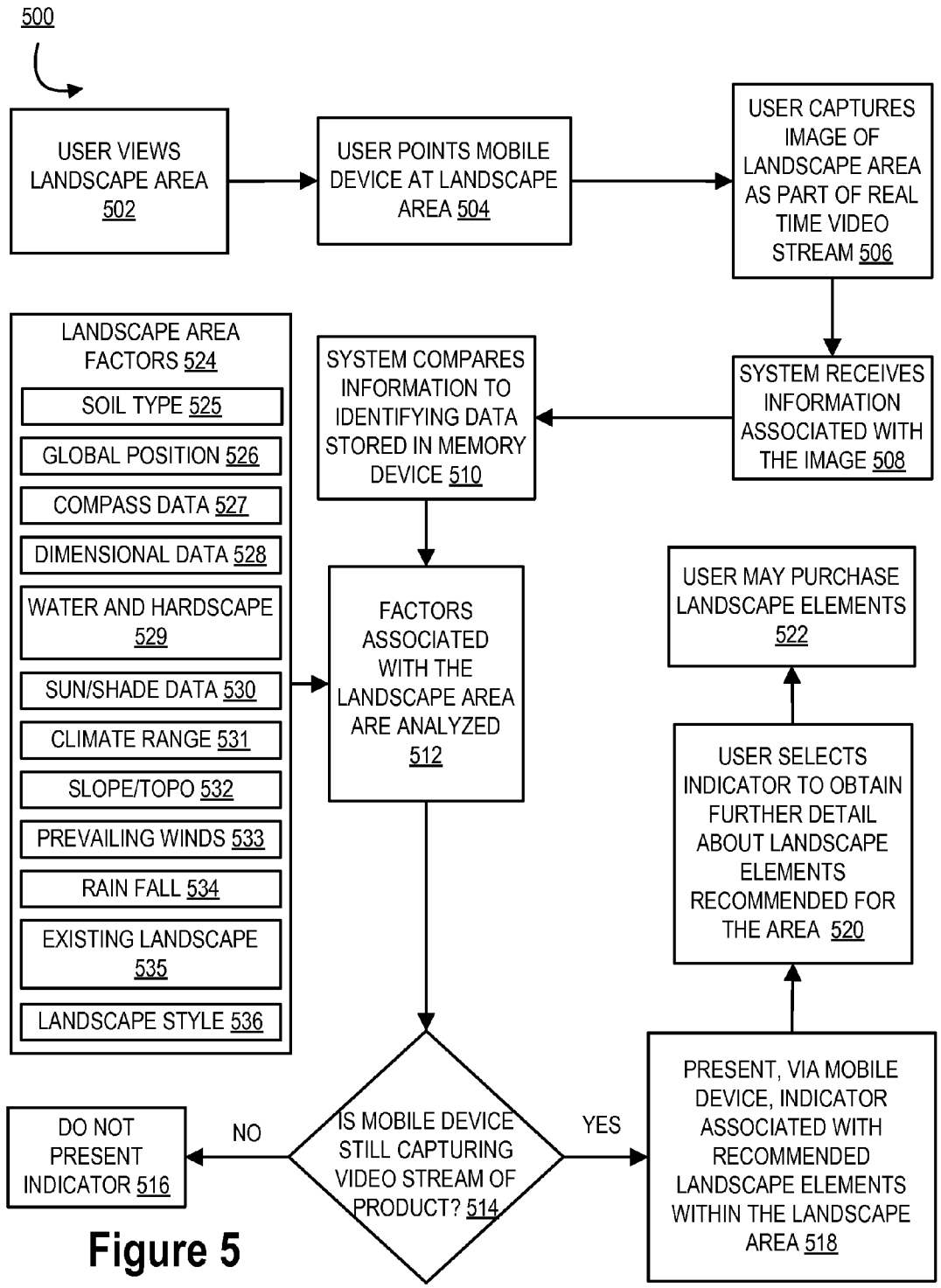
Figure 6:
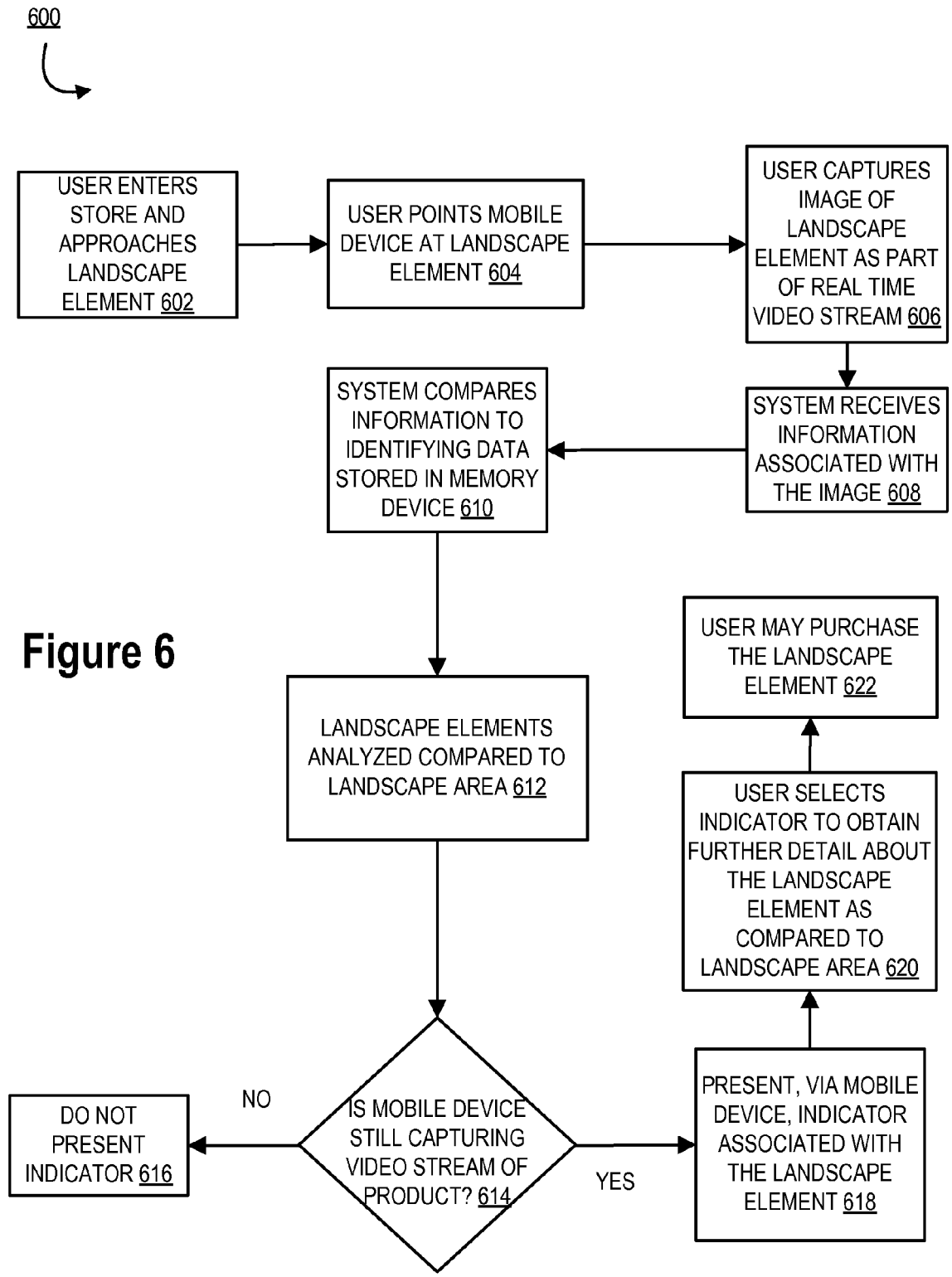
Figure 7:
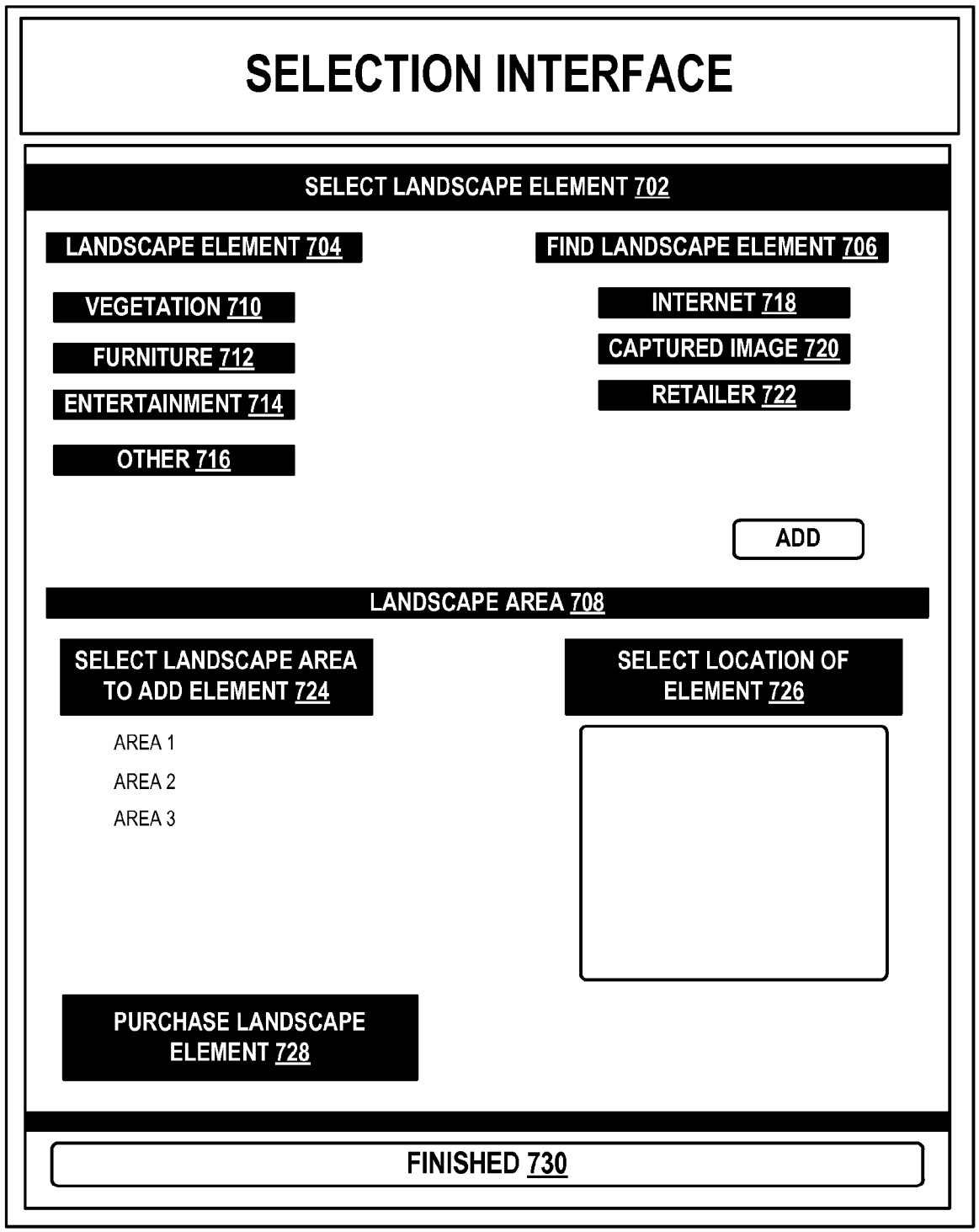

Having thus described embodiments of the invention in general terms, reference will now be made to the accompanying drawings, which are not necessarily drawn to scale, and wherein:

FIG. 1 provides a high level process flow illustrating a real-time landscaping process, in accordance with one embodiment of the present invention;

FIG. 2 provides a landscaping information system environment, in accordance with an embodiment of the invention;

FIG. 3 provides a block diagram illustrating a mobile device, in accordance with an embodiment of the invention;

FIG. 4 provides an a representation illustrating a mobile device real-time video stream display environment, in accordance with an embodiment of the invention;

FIG. 5 provides a process map for providing landscape information, in accordance with an embodiment of the invention;

FIG. 6 provides a process map for providing landscape information, in accordance with an embodiment of the invention; and FIG. 7 provides a landscape element selection interface, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that offer payment account systems to users.

While embodiments discussed herein are generally described with respect to "real-time video streams" or "real-time video" it will be appreciated that the video stream may be captured and stored for later viewing and analysis. Indeed, in some embodiments, video is recorded and stored on a mobile device and portions or the entirety of the video may be analyzed at a later time. The later analysis may be conducted on the mobile device or loaded onto a different device for analysis. The portions of the video that may be stored and analyzed may range from a single frame of video (e.g., a screenshot) to the entirety of the video. Additionally, rather than video, the user may opt to take a still picture of the environment to be analyzed immediately or at a later time. Embodiments in which real-time video, recorded video or still pictures are analyzed are contemplated herein.

Some embodiments of the invention herein are generally described as involving "landscape areas." Landscape areas include any outdoor or open air area in which a user wishes to add landscape elements. Examples of landscape areas may include areas around a house, building, parks, decks, balconies, and the like. Further, some embodiments of the invention herein are generally described as involving "landscape elements." Landscape elements are any items that a user may wish to place in a landscape area. Landscape elements may include vegetation, such as plants, trees, grasses, flowers and the like. Landscape elements may also include furniture, decks, grill areas, fire pits, fireplaces, rocks, stones, ponds, playground equipment, pools, or any other products that a user may wish to place in an outdoor area.

FIG. 1 illustrates a high level process flow of a real-time landscaping process 100, which will be discussed in further detail throughout this specification with respect to FIGS. 2 through 7. The first step in the process 100 is to receive information associated with an image, where the image was captured by a mobile device using real-time video stream, the mobile device operated by a user, as illustrated by block 102. A real-time video stream may include images landscape areas or landscape elements. For example, a user may move about his/her backyard while capturing a real-time video stream of the environment including the dimensions, current vegetation, and the like. In another embodiment of the invention, a user may move in an aisle of a store or shopping mall while capturing a real-time video stream of the environment including landscape elements that the user may wish to incorporate into his/her landscape area. In additional embodiments, the real-time video stream may be captured from a mobile device affixed to a moving vehicle, such as an automobile or the like, such that as the vehicle is driven, real-time video stream may be captured including images of other landscape areas that the user likes and may wish to incorporate into his landscape area.

Next, in block 104 a determination is made as to which images from the real-time video stream are associated with landscape areas or landscape elements of users or individuals associated with the users of a mobile device. The determination is made by analyzing the real-time video stream for objects, logos, soil, dimensions, compass information, and/or other landscape area-indicating features or landscape element-indications features to determine what is within the video stream field and to then provide matches (i.e., associations) of landscape elements with a landscape area based on several factors. The factors may include global position, compass position of mobile device capturing the landscape image or video, climate range, rain fall averages, sun/shade, slope/topography, soil type, prevailing winds, dimensional data, existing plant, water and hardscape features, and the like. Other factors may include the selected landscaping style desired, such as formal, informal, Tuscan, Italian, Mediterranean, English garden, tropical, Asian, contemporary, desert, and/or xeriscape styles.

Thereafter, at block 106 one or more indicators are presented on the display of the mobile device in conjunction with the real-time video stream. In some embodiments, the indicators are presented when the user captures a landscape area. Each of the indicators is associated with an image determined to be a landscape element or a landscape area. The images associated with a landscape element are matched with the landscape area of the user of the mobile device, such that the landscape elements selected are specifically designed to fit into the landscape area. For example, a tree requiring full sun may be selected by the system to be positioned within the landscape area where there is full sun. The indicator may take various forms, such as display of a tag, a highlighted area, a hot-spot, or the like. In specific embodiments, the indicator is a selectable indicator, such that a user may select (e.g., click-on, hover-over, touch the display, provide a voice command, and/or the like) the landscape element or indicator to provide display of specifics related to the landscape element and offers for purchasing the element. In some embodiments, the indicator itself may provide the information or a portion of the information to the user. In addition, the information related to the landscape element or landscape area may include a review of the element or area by the system or associated individual.

FIG. 2 provides a landscaping information system environment 200, in accordance with one embodiment of the present invention. As illustrated in FIG. 2, the real-time video image server 208 is operatively coupled, via a network 201 to the mobile device 204. In this way, the real-time video image server 208 can send information to and receive information from the mobile device 204, to associate indicators within the real-time video stream to provide landscape element data and landscape element purchasing data to the user. FIG. 2 illustrates only one example of an embodiment of a landscaping information system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

In some embodiments, the user 202 is an individual. The user 202 may be a home owner, park director, landscaper, or any other individual wishing to use real-time video analysis for landscape information. The user 202 may be in range of any landscape area or landscape element for which the user 202 may wish to consider implementing using the real-time video system. In some embodiments, the user 202 may purchase the landscape element via selecting the indicator associated with the element. The transaction for purchase of the landscape element may be made by the user 202 using the mobile device 204, such as a mobile wallet (i.e., smart phone, PDA, etc.) or other types of payment options, such as credit cards, checks, cash, debit cards, loans, lines of credit, virtual currency, etc. that allow the user 202 to make a transaction to purchase the landscape element.

As illustrated in FIG. 2, the real-time video image server 208 generally comprises a communication device 210, a processing device 212, and a memory device 216. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 212 is operatively coupled to the communication device 210 and the memory device 216. The processing device 212 uses the communication device 210 to communicate with the network 201 and other devices on the network 201, such as, but not limited to the mobile device 204. As such, the communication device 210 generally comprises a modem, server, or other device for communicating with other devices on the network 201.

In some embodiments, the processing device 212 may also be capable of operating one or more applications, such as one or more applications functioning as an artificial intelligence ("AI") engine. The processing device 212 may recognize landscape elements or landscape areas that it has identified in prior uses by way of the AI engine. In this way, the processing device 212 may recognize specific landscape elements and/or classes of elements, and store information related to the recognized landscape element in one or more memories and/or databases discussed herein. Once the AI engine has thereby "learned" of a landscape element and/or class of elements, the AI engine may run concurrently with and/or collaborate with other modules or applications described herein to perform the various steps of the methods discussed. For example, in some embodiments, the AI engine recognizes a landscape element that has been recognized before and stored by the AI engine. The AI engine may then communicate to another application or module of the mobile device and/or server, an indication that the landscape element may be the same landscape element previously recognized. In this regard, the AI engine may provide a baseline or starting point from which to determine the nature of the landscape element. In other embodiments, the AI engine's recognition of a landscape element is accepted as the final recognition of the element.

As further illustrated in FIG. 2, the real-time video image server 208 comprises computer-readable instructions 218 stored in the memory device 216, which in one embodiment includes the computer-readable instructions 218 of a server application 224. In some embodiments, the memory device 216 includes data storage 222 for storing data related to landscape information including but not limited to data created and/or used by the server application 224 or a directory created by the user 202.

In the embodiment illustrated in FIG. 2 and described throughout much of this specification, the server application 224 may analyses landscape areas captured by a user 202 using a real-time video stream. The server application 224 analyzes factors associated with the landscape area in order to predict a recommended landscape element to include in the landscape area. The factors the server application 224 analyzes includes, but is not limited to global position, compass position of mobile device capturing the landscape image or video, climate range, rain fall averages, sun/shade, slope/topography, soil type, prevailing winds, dimensional data, existing plant, water and hardscape features, and the like. Other factors may include the selected landscaping style desired, such as formal, informal, Tuscan, Italian, Mediterranean, English garden, tropical, Asian, contemporary, desert, and/or xeriscape styles.

Once the server application 224 analyzes the user's 202 landscape area, the server application 224 provides the user 202 a virtual landscape area incorporating proposed landscape elements based on the factors. For example, the user 202 may have captured his backyard using the real-time image capture on his mobile device 204. The server application 224, after analyzing the factors associated with the backyard, provides the user a virtual image of his/her back yard that includes the landscape elements the server application 224 determines as recommended. A recommended landscape element is one that may produce its maximum potential or a high potential given the location of the landscape area. For example, a flower that requires full sun light will reach its maximum potential if the flower is located in the landscape area that has full sun light. Furthermore, the virtual image of the back yard provides the user 202 an ability to visualize a proposed landscape design. It is understood that either one or a list of possible landscape elements suitable for the landscape area may be displayed to the user for selection.

In some embodiments, the server application 224 may further provide access to a directory storing landscape elements or landscape areas of a user 202. The server application 224 allows the user 202 to manually input, via a mobile device 204 or other device with similar processing features such as a computer, tablet, hand held device, etc., landscape elements that the user 202 wishes for the system to consider when adding landscape elements to a landscape area. The user 202 inputs may be added by the user 202 through the use of an interface, social networking site, and/or the like. In this way, the user 202 may provide user 202 inputs by several means, thus allowing for easy accessibility to update the user's landscape element requests. The data stored within the server application 224 provides computer readable instructions 218 to the processing device 212 to allow for selection of these landscape elements when determining a recommended landscape elements. The server application 224 stores the user 202 inputted landscape element so that the server application 224 may incorporate the inputted landscape elements into a landscape area when appropriate.

In some embodiments, as described in further detail below, the server application 224 may recognize a marker 230 and/or objects 220 within an environment 250. The marker 230 may be interpreted with respect to data in the memory device 216 and be recognized as a possible landscape element that may be available to the user 202. In this way, the real-time video image server 208 provides marker 230 interpretations and analysis with respect to the data on the real-time video image server 208.

Whether the landscape elements are provided by recommendation from the server application 224 or by the user 202, the user may select the landscape element and move it within the landscape area. In this way, the user 202 may place the landscape elements where he/she wishes and view the landscape area with the landscape elements in various locations. When the user 202 moves the landscape element into a location on the landscape area other than the one recommended by the system, the indicator associated with the landscape element will provide the user 202 with information regarding the possible issues with moving the landscape element to that location. For example, a user 202 may move a pool from one side of the landscape area to another. However, the system may provide the user 202 information regarding a root system that would kill several large trees in the area if the pool was moved to that location or warn the user that the trees will create excessive cleaning/maintenance issues with the pool. In some embodiments, once a user 202 moves a landscape element from one location on the landscape area to another location on the landscape area, the indicator will provide a percentage of survival of that landscape element, if the landscape element is vegetation. The percentage information is based on the factors analyzed by the server application 224.

In some embodiments, the server application 224 may analyze landscape elements captured by a user 202 using a real-time video stream at a store or retailer. The server application 224 analyzes the landscape elements the user 202 captures and stores the landscape elements in the memory device 216. The server application 224 may provide an indicator to the user 202 for the landscape element. The indicator may provide the user 202 with the ability to purchase the landscape element, information about the landscape element, and allow the user 202 move and position the landscape element within the virtual landscape area.

The server application 224 may further provide the user 202 on the display of a mobile device, offers to purchase the landscape elements or similar landscape elements. Offers may be from several retailers of the landscape element, thus giving the user 202 options from whom to purchase the landscape element. Offers to purchase may further include special offers in the form of a discount, coupon, etc. that may expire within a predetermined amount of time or may be available to the user at any time he wishes to make a transaction. If the user 202 selects to purchase the landscape element through the indicator 230 on the display of the mobile device, the server application 224 may communicably link with the user's 202 desired financial institution to authorize the transaction. In this way, the system may provide convenient purchasing of a landscape item that the user 202 wishes to include in his landscape area.

As further illustrated is FIG. 2, an environment 250 in which the user 202 utilizes a mobile device 204 to capture real-time video of an environment 250 in an augmented reality experience. As described in further detail below with respect to FIG. 3, the mobile device 204 may be any mobile communication device. The mobile device 204 has the capability of capturing real-time video of the surrounding environment 250. The real-time video capture may be by any means known in the art. In one particular embodiment, the mobile device 204 is a mobile telephone equipped with a camera capable of video capture.

The environment 250 contains a number of objects 220. Objects 220 include, but are not limited to a landscape element, landscape area, and/or the like that the user 202 may wish to utilize the system for. Some of such objects 220 may include an marker 230 identifiable to the mobile device 204. An marker 230 may be any type of marker that is a distinguishing feature that can be interpreted to identify specific objects 220. In some embodiments, the marker 230 may be interpreted by the mobile device 204. In other embodiments, the marker 230 may be interpreted by the real-time video image server 208. In yet other embodiments, the marker 230 may be interpreted by both the mobile device 204 and the real-time video image server 208. For instance, an marker may be alpha-numeric characters, symbols, logos, shapes, ratio of size of one feature to another feature, a product identifying code such as a bar code, electromagnetic radiation such as radio waves (e.g., radio frequency identification (RFID)), architectural features, color, etc. In some embodiments, the marker 230 may be audio and the mobile device 204 may be capable of utilizing audio recognition to identify words or unique sounds broadcast. The marker 230 may be any size, shape, etc. Indeed, in some embodiments, the marker 230 may be very small relative to the object 220 such as the alpha-numeric characters that identify the name or model of an object 220, whereas, in other embodiments, the marker 230 is the entire object 220 such as the unique shape, size, structure, etc.

In some embodiments, the marker 230 is not actually a physical marker located on or being broadcast by the object 220. For instance, the marker 230 may be some type of identifiable feature that is an indication that the object 220 is nearby. In some embodiments, the marker 230 for an object 220 may actually be the marker 230 for a different object 220. For example, the mobile device 204 may recognize a particular building as being "Building A." Data stored in the data storage 371 may indicate that "Building B" is located directly to the east and next to "Building A." Thus, marker 230 for an object 220 that are not located on or being broadcast by the object 220 are generally based on fixed facts about the object 220 (e.g., "Building B" is next to "Building A"). However, it is not a requirement that such a marker 230 be such a fixed fact. The marker 230 may be anything that enables the mobile device 204 and/or the financial institution application 224 to interpret to a desired confidence level what the object is. For example, the mobile device 204, object recognition application 325 and/or AR presentation application 321 may be used to identify a particular person as a first character from a popular show, and thereafter utilize the information that the first character is nearby features of other characters to interpret that a second character, a third character, etc. are nearby, whereas without the identification of the first character, the features of the second and third characters may not have been used to identify the second and third characters. This example may also be applied to objects outside of people.

The marker 230 may also be, or include, social network data, such as data retrieved or communicated from the Internet, such as tweets, blog posts, social networking site posts, various types of messages and/or the like. In other embodiments, the marker 230 is provided in addition to social network data as mentioned above. For example, mobile device 204 may capture a video stream and/or one or more still shots of a large gathering of people. In this example, as above, one or more people dressed as characters in costumes may be present at a specified location. The mobile device 204, object recognition application 325, and/or the AR presentation application 321 may identify several social network indicators, such as posts, blogs, tweets, messages, and/or the like indicating the presence of one or more of the characters at the specified location. In this way, the mobile device 204 and associated applications may communicate information regarding the social media communications to the user and/or use the information regarding the social media communications in conjunction with other methods of object recognition. For example, the mobile device 204 object recognition application 325, and/or the AR presentation application 321 performing recognition of the characters at the specified location may confirm that the characters being identified are in fact the correct characters based on the retrieved social media communications. This example may also be applied objects outside of people.

In some embodiments, the mobile device and/or server accesses one or more other servers, social media networks, applications, and/or the like in order to retrieve and/or search for information useful in performing an object recognition. In some embodiments, the mobile device and/or server accesses another application by way of an application programming interface or API. In this regard, the mobile device and/or server may quickly search and/or retrieve information from the other program without requiring additional authentication steps or other gateway steps.

In some embodiments, markers 230 may be recognized by the server application 224. For example, the server application 224 may identify a marker 230 as being a specific landscape element, the server application 224 may then provide real-time data indicating the proposed location for the landscape element within the landscape area of the user 202. For example, the marker 230 may identify the landscape element as a birch tree. In this way, the server application 224 may provide an appropriate location within the user's 202 landscape area for the birch tree. The server application 224 may also provide an indicator of the other types of landscape elements that may be recommended in the landscape area.

While FIG. 2 illustrates that the objects 220 with markers 230 only include a single marker 230, it will be appreciated that the object 220 may have any number of markers 230 with each equally capable of identifying the object 220. Similarly, multiple markers 230 may be identified by the mobile device 204 such that the combination of the markers 230 may be utilized to identify the object 220. For example, the facial recognition may identify a person as a famous athlete, and thereafter utilize the uniform the person is wearing to confirm that it is in fact the famous athlete.

In some embodiments, a marker 230 may be the location of the object 220. In such embodiments, the mobile device 204 may utilize GPS software to determine the location of the user 202. As noted above, a location-based marker 230 could be utilized in conjunction with other non-location-based markers 230 identifiable and recognized by the mobile device 204 to identify the object 220. However, in some embodiments, a location-based marker 230 may be the only marker 230. For instance, in such embodiments, the mobile device 204 may utilize GPS software to determine the location of the user 202 and a compass device or software to determine what direction the mobile device 204 is facing in order to identify the object 220. In still further embodiments, the mobile device 204 does not utilize any GPS data in the identification. In such embodiments, markers 230 utilized to identify the object 220 are not location-based.

FIG. 3 illustrates an embodiment of a mobile device 204 that may be configured to execute object recognition and/or augmented reality functionality. A "mobile device" 204 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

The mobile device 204 may generally include a processing device 310 communicably coupled to such devices as a memory device 320, user output devices 336, user input devices 340, a network interface 360, a power source 315, a clock or other timer 350, a camera 370, a positioning system device 375, one or more chips 380, etc.

In some embodiments, the mobile device 204 and/or server access one or more databases or datastores (not shown) to search for and/or retrieve information related to the object and/or marker. In some embodiments, the mobile device 204 and/or the server access one or more datastores local to the mobile device 204 and/or server and in other embodiments, the mobile device 204 and/or server access datastores remote to the mobile device and/or server. In some embodiments, the mobile device 204 and/or server access both a memory and/or datastore local to the mobile device 204 and/or server as well as a datastore remote from the mobile device 204 and/or server The processing device 310 may include functionality to operate one or more software programs or applications, which may be stored in the memory device 320. For example, the processing device 310 may be capable of operating a connectivity program, such as a web browser application 322. The web browser application 322 may then allow the mobile device 204 to transmit and receive web content, such as, for example, location-based content and/or other web page content, according to a Wireless Application Protocol (WAP), Hypertext Transfer Protocol (HTTP), and/or the like.

The processing device 310 may also be capable of operating applications, such as an object recognition application 325 and/or an AR presentment application 321. The object recognition application 325 and/or the AR presentment application 321 may be downloaded from a server and stored in the memory device 320 of the mobile device 204. Alternatively, the object recognition application 325 and/or the AR presentment application 321 may be pre-installed and stored in a memory in the chip 380. In such an embodiment, the user may not need to download the object recognition application 325 and/or the AR presentment application 321 from a server. In this way the object recognition application 325 and/or the AR presentment application 321 may remain at the server, such as the real-time video image server 208, within the server application 224.

The object recognition application 325 provides the mobile device 204 with object recognition capabilities. In this way, objects 220 such as products and/or the like may be recognized by the object 220 itself and/or markers 230 associated with the objects 220. This is described in further detail below with respect to FIG. 4. In this way the object recognition application 325 may communicate with other devices on the network 201 to determine the object 220 within the real-time video stream.

The AR presentment application 321 provides the mobile device 204 with AR capabilities. In this way, the AR presentment application 321 may provide superimposed indicators related to the object 220 in the real-time video stream, such that the user 202 may have access to the targeted offers by selecting an indicator superimposed on the real-time video stream. The AR presentment application 321 may communicate with the other devices on the network 201 to provide the user 202 with indications associated with targeted offers for objects 202 in the real-time video display. The presentation and selection of indicators provided to the user 202 via the AR presentment application 321 is described in further detail below with respect to FIG. 5.

The chip 380 may include the necessary circuitry to provide the object recognition and/or the AR functionality to the mobile device 204. Generally, the chip 380 will include data storage 371 which may include data associated with the objects within a real-time video stream that the object recognition application 325 identifies as having a certain marker(s). The chip 380 and/or data storage 371 may be an integrated circuit, a microprocessor, a system-on-a-chip, a microcontroller, or the like. As discussed above, in one embodiment, the chip 380 may provide the object recognition and/or AR functionality to the mobile device 204.

Of note, while FIG. 3 illustrates the chip 380 as a separate and distinct element within the mobile device 204, it will be apparent to those skilled in the art that the chip 380 functionality may be incorporated within other elements in the mobile device 204. For instance, the functionality of the chip 380 may be incorporated within the memory device 320 and/or the processing device 310. In a particular embodiment, the functionality of the chip 380 is incorporated in an element within the mobile device 204 that provides object recognition and/or the AR capabilities to the mobile device 204. Still further, the chip 380 functionality may be included in a removable storage device such as an SD card or the like.

The processing device 310 may be configured to use the network interface 360 to communicate with one or more other devices on a network 201 such as, but not limited to the real-time video image server 208. In this regard, the network interface 360 may include an antenna 376 operatively coupled to a transmitter 374 and a receiver 372 (together a "transceiver"). The processing device 310 may be configured to provide signals to and receive signals from the transmitter 374 and receiver 372, respectively. The signals may include signaling information in accordance with the air interface standard of the applicable cellular system of the wireless telephone network that may be part of the network 201. In this regard, the mobile device 204 may be configured to operate with one or more air interface standards, communication protocols, modulation types, and access types. By way of illustration, the mobile device 204 may be configured to operate in accordance with any of a number of first, second, third, and/or fourth-generation communication protocols and/or the like. For example, the mobile device 204 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 204 may also be configured to operate in accordance with non-cellular communication mechanisms, such as via a wireless local area network (WLAN) or other communication/data networks.

The network interface 360 may also include an application interface 373 in order to allow a user to execute some or all of the above-described processes with respect to the object recognition application 325, the AR presentment application 321, and/or the chip 380. In some embodiments, the application interface 373 may further execute some or all of the above-described processes with respect to the server application 224. The application interface 373 may have access to the hardware, e.g., the transceiver, and software previously described with respect to the network interface 360. Furthermore, the application interface 373 may have the ability to connect to and communicate with an external data storage on a separate system within the network 201. In some embodiments, the external data is stored in the memory device 216 of the real-time video image server 208.

As described above, the mobile device 204 may have a user interface that includes user output devices 336 and/or user input devices 340. The user output devices 336 may include a display 330 (e.g., a liquid crystal display (LCD) or the like) and a speaker 332 or other audio device, which are operatively coupled to the processing device 310. The user input devices 340, which may allow the mobile device 204 to receive data from a user 202, may include any of a number of devices allowing the mobile device 204 to receive data from a user 202, such as a keypad, keyboard, touch-screen, touchpad, microphone, mouse, joystick, other pointer device, button, soft key, and/or other input device(s).

The mobile device 204 may further include a power source 315. Generally, the power source 315 is a device that supplies electrical energy to an electrical load. In one embodiment, power source 315 may convert a form of energy such as solar energy, chemical energy, mechanical energy, etc. to electrical energy. Generally, the power source 315 in a mobile device 204 may be a battery, such as a lithium battery, a nickel-metal hydride battery, or the like, that is used for powering various circuits (e.g., the transceiver circuit, and other devices that are used to operate the mobile device 204). Alternatively, the power source 315 may be a power adapter that can connect a power supply from a power outlet to the mobile device 204. In such embodiments, a power adapter may be classified as a power source "in" the mobile device.

The mobile device 204 may also include a memory device 320 operatively coupled to the processing device 310. As used herein, memory may include any computer readable medium configured to store data, code, or other information. The memory device 320 may include volatile memory, such as volatile Random Access Memory (RAM) including a cache area for the temporary storage of data. The memory device 320 may also include non-volatile memory, which can be embedded and/or may be removable. The non-volatile memory may additionally or alternatively include an electrically erasable programmable read-only memory (EEPROM), flash memory or the like.

The memory device 320 may store any of a number of applications or programs which comprise computer-executable instructions/code executed by the processing device 310 to implement the functions of the mobile device 204 described herein. For example, the memory device 320 may include such applications as an object recognition application 325, an AR presentment application 321, a web browser application 322, an SMS application 323, an email application 324, etc.

FIG. 4 further illustrates a mobile device 204 wherein the user 202 has executed an object recognition application 325, an AR presentment application 321, and a real-time video capture device (e.g., camera 370) is utilized to display the surrounding environment 250 on the display 330 of the mobile device 204. In some embodiments, the object recognition application 325 is configured to utilize markers 230 to identify objects 220, such as landscape elements or landscape areas, and indicate to the user 202 identified objects 220 by displaying a virtual image 400 on the mobile device display 330. As illustrated in FIG. 4, if an object 220 does not have any markers 230 (or at least enough markers 230 to yield object identification), the object 220 will be displayed without an associated virtual image 400.

The object recognition application 325 may use any type of means in order to identify desired objects 220. For instance, the object recognition application 325 may utilize one or more pattern recognition algorithms to analyze objects in the environment 250 and compare with markers 230 in data storage 371 which may be contained within the mobile device 204 (such as within chip 380) or externally on a separate system accessible via the connected network 201, such as but not limited to the real-time video image server 208. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like.

Upon identifying an object 220 within the real-time video stream, the AR presentment application 321 is configured to superimpose a virtual image 400 on the mobile device display 330. The virtual image 400 is generally a tab or link displayed such that the user 202 may "select" the virtual image 400 and retrieve information related to the identified object. The information may include any desired information associated with the selected object and may range from basic information to greatly detailed information. In some embodiments, the virtual image 400 may provide the user 202 with an internet hyperlink to further information on the object 220. The information may include, for example, all types of media, such as text, images, clipart, video clips, movies, or any other type of information desired. In yet other embodiments, the virtual image 400 information related to the identified object may be visualized by the user 204 without "selecting" the virtual image 400.

In embodiments in which the virtual image 400 provided by the AR presentment application 321 may provide an interactive tab to the user 202, the user 202 may select the virtual image 400 by any conventional means for interaction with the mobile device 204. For instance, in some embodiments, the user 202 may utilize an input device 340 such as a keyboard to highlight and select the virtual image 400 in order to retrieve the information. In a particular embodiment, the mobile device display 330 includes a touch screen that the user may employ to select the virtual image 400 utilizing the user's finger, a stylus, or the like.

In some embodiments, the virtual image 400 is not interactive and simply provides information to the user 202 by superimposing the virtual image 400 onto the display 330. For example, in some instances it may be beneficial for the AR presentment application 321 to merely identify an object 220, just identify the object's name/title, give brief information about the object, etc., rather than provide extensive detail that requires interaction with the virtual image 400. The mobile device 204 is capable of being tailored to a user's desired preferences.

Furthermore, the virtual image 400 may be displayed at any size on the mobile device display 330. The virtual image 400 may be small enough that it is positioned on or next to the object 220 being identified such that the object 220 remains discernable behind the virtual image 400. Additionally, the virtual image 400 may be semi-transparent such that the object 220 remains discernable behind the virtual image. In other embodiments, the virtual image 400 may be large enough to completely cover the object 220 portrayed on the display 330. Indeed, in some embodiments, the virtual image 400 may cover a majority or the entirety of the mobile device display 330.

The user 202 may opt to execute the object recognition application 325 and/or the AR presentment application 321 at any desired moment and begin video capture and analysis. However, in some embodiments, the object recognition application 325 and/or the AR presentment application 321 includes an "always on" feature in which the mobile device 204 is continuously capturing video and analyzing the objects 220 within the video stream. In such embodiments, the object recognition application 325 may be configured to alert the user 202 that a particular object 220 has been identified. The user 202 may set any number of user preferences to tailor the AR experience to his needs. For instance, the user 202 may opt to only be alerted if a certain particular object 220 is identified. Additionally, it will be appreciated that the "always on" feature in which video is continuously captured may consume the mobile device power source 315 more quickly. Thus, in some embodiments, the "always on" feature may disengage if a determined event occurs such as low power source 315, low levels of light for an extended period of time (e.g., such as if the mobile device 204 is in a user's pocket obstructing a clear view of the environment 250 from the mobile device 204), if the mobile device 204 remains stationary (thus receiving the same video stream) for an extended period of time, the user sets a certain time of day to disengage, etc. Conversely, if the "always on" feature is disengaged due to the occurrence of such an event, the user 202 may opt for the "always on" feature to re-engage after the duration of the disengaging event (e.g., power source 315 is re-charged, light levels are increased, etc.).

In some embodiments, the user 202 may identify objects 220 that the object recognition application 325 does not identify and add it to the data storage 371 with desired information in order to be identified and/or displayed in the future. For instance, the user 202 may select an unidentified object 220 and enter a name/title and/or any other desired information for the unidentified object 220. In such embodiments, the object recognition application 325 may detect/record certain markers 230 about the object so that the pattern recognition algorithm(s) (or other identification means) may detect the object 220 in the future. Furthermore, in cases where the object information is within the data storage 371, but the object recognition application 325 fails to identify the object 220 (e.g., one or more identifying characteristics or markers 230 of the object has changed since it was added to the data storage 371 or the marker 230 simply was not identified), the user 202 may select the object 220 and associate it with an object 220 already stored in the data storage 371. In such cases, the object recognition application 325 and/or AR presentment application 321 may be capable of updating the markers 230 for the object 220 in order to identify the object in future real-time video streams.

In addition, in some embodiments, the user 202 may opt to edit the information or add to the information provided by the virtual object 400. For instance, the user 202 may opt to include user-specific information about a certain object 220 such that the information may be displayed upon a future identification of the object 220. Conversely, in some embodiments, the user may opt to delete or hide an object 220 from being identified and a virtual object 400 associated therewith being displayed on the mobile device display 330.

Furthermore, in some instances, an object 220 may include one or more markers 230 identified by the object recognition application 325 that leads the object recognition application 325 to associate an object with more than one object in the data storage 371. In such instances, the user 202 may be presented with the multiple candidate identifications and may opt to choose the appropriate identification or input a different identification. The multiple candidates may be presented to the user 202 by any means. For instance, in one embodiment, the candidates are presented to the user 202 as a list wherein the "strongest" candidate is listed first based on reliability of the identification. Upon input by the user 202 identifying the object 220, the object recognition application 325 and/or the AR presentment application 321 may "learn" from the input and store additional markers 230 in order to avoid multiple identification candidates for the same object 220 in future identifications.

Additionally, the object recognition application 325 may utilize other bases for identification than identification algorithms. For instance, the object recognition application 325 may utilize the user's location, time of day, season, weather, speed of location changes (e.g., walking versus traveling), "busyness" (e.g., how many objects are in motion versus stationary in the video stream), as well any number of other conceivable factors in determining the identification of objects 220. Moreover, the user 202 may input preferences or other metrics for which the object recognition application 325 may utilize to narrow results of identified objects 220.

In some embodiments, the AR presentment application 321 may have the ability to gather and report user interactions with displayed virtual objects 400. The data elements gathered and reported may include, but are not limited to, landscape elements and landscape areas. Such user interactions may be reported to any type of entity desired.

In some embodiments, the information provided by the real-time video stream may be compared to data provided to the system through an API. In this way, the data may be stored in a separate application and be implemented by request from the mobile device and/or server.

FIG. 5 illustrates a process map for providing landscape information using a real-time video stream 500. At block 502 the user 202 views a landscape area or a landscape element. In additional embodiments, a real-time video stream may be captured from a mobile device affixed to a moving vehicle, such as an automobile or the like, such that as the vehicle moves, real-time video stream is captured including images of landscape areas that the vehicle passes. In this way, the user 202 may capture real-time images of the landscape area he wishes to landscape or the user 202 may capture real-time images of landscape areas that he wishes to immolate in his landscape area. Once the user 202 enters the landscape area or passes by a landscape area that the user 202 likes, the user 202 may point his mobile device at the landscape area or the landscape element, as shown in block 504.

At block 506 the user 202 may capture images of landscape areas or landscape elements, as part of a real-time video stream. In some embodiments, the user 202 may point his/her mobile device at a landscape area, such as a yard, park, deck, etc. In other embodiments, the user 202 may point his/her mobile device at a landscape element, such as trees, flowers, bushes, rocks, bricks, pools, decking, furniture, mulch, etc. These landscape elements may be in a landscape area or in a retail store or business. Once the user has captured images, the system may receive information associated with the image 508. The image may be a single frame of video (e.g., a screenshot), an entirety of a video, or any portion in between. Additionally, rather than video, the user may opt to take a still picture of the environment. The image may further comprise of multiple single images compiled together. In some embodiments, the system may recognize the landscape area within the captured image. In other embodiments, the system may recognize the landscape elements within the captured image. In yet other embodiments, the system may recognize landscape styles within the captured image.

Once the server application 224 or mobile device 204 receives the information associated with the image, a comparison of the information from the image to identifying data to a directory, stored in the memory device is performed, as illustrated in block 510. The directory may first determine the landscape element or landscape area in the image, from the information sent to the system. For example, if the user 202 is using real-time video stream to identify his/her backyard, the data from the image the user 202 took may provide data to the server application 224 or the mobile device 204 such that the factors associated with the landscape area 524 that have been previously analyzed may be known. Second, the directory may include a database of information for landscape elements and landscape styles. The information for landscape elements includes data about each landscape element as it pertains to the factors for landscape areas. Therefore once the system determines the landscape element in the image or manually inputted by the user, the directory may compare the factors of the user's 202 landscape area to the data of that particular landscape element to determine a score for that landscape element. The score of the landscape element provides an indication on how close of a match the landscape element is in relation to the landscape area, based on the factors. In this way the system may score each element to determine which element may be best situated for the user's 202 landscape area. The database for landscape styles functions similar to the database for landscape elements. In this way, the system may determine a score for how closely the landscape element matches the landscape style of the user 202.

At block 512 factors are analyzed with respect to a landscape area and/or a landscape element, to provide a recommended landscape element for a landscape area. The recommended landscape element is presented in the landscape area virtually on the mobile device 204 of the user 202. In this way, the user 202 may virtually view his landscape area with landscape elements positioned in the area. Furthermore, the user 202 may be able to position the landscape elements into different positions within the area. Determining a recommended landscape element for a landscape area depends on the landscape element properties and how those properties coincide with the landscape area. To determine if the properties of the landscape elements are appropriate for a landscape area, landscape area factors 524 are analyzed. Landscape element properties allow the landscape element to work up to its maximum potential. For example, a flower may require partial sun, therefore the maximum potential of the flower is more likely to be reached if the flower is in partial sun. In another example, a pool may reach its maximum potential when it is not located directly under a tree that may have leaves and other sediments that may fall into the pool and cause the filters to not work efficiently.

Landscape area factors 524 include soil type 525, global positioning data 526, compass data 527, dimensional data 528, water and hardscape 529, sun/shade data 530, climate range 531, slope/topography 532, prevailing winds 533, rain fall 534, existing landscape 535, and landscape styles 536. Soil type 525 may aid in predicting the proper vegetation for a specific landscape area. Soil type 525 may be analyzed by the system, such that the system may recognize if the soil is clay based, top soil, nutrient rich soil, etc. For example, specific landscape elements may not grow to their maximum potential if they are in a clay based soil. However, other landscape elements may thrive in a clay based soil environment. Therefore, the system may determine the soil type 525 of the landscape area in order to recommend landscape elements for the landscape area that may reach their maximum potential in the soil of the landscape area. In some embodiments, the soil type 525 may be determined by utilizing the other landscape area factors 524, such as GPS data 526 or compass data 527. In other embodiments, the soil type 525 may be determined by the system analyzing the captured image of the landscape area.

Global positioning data 526 and compass data 527 provide location and directional basis for the determination of a recommended landscape elements location within a landscape area. GPS data 526 provides the location of the user's 202 landscape area so that weather data, latitudinal data, and even soil type 525 may be determined by GPS data 526. Compass data 527 provides directional indicators of the landscape area, such that sun/shade regions of the landscape area may be determined. For example, the compass data 527 may determine where on the landscape area will be full sun, partial sun, or full shade. For example if a house is located in the landscape area, the system will recognize that if the east side of the house will get morning light and the west side of the house will get afternoon light whereas the north and south sides of the house may be mostly shade.

Further, global positioning data 526 may provide the system with U.S. Department of Agriculture (USDA) zone data or data from Extension Offices. In this way, the user 202 may determine that if the landscape element is a proper element for that zone.

Global positioning data 536 may also determine home owners' association regulations, local ordinances, and the like. In this way, the system may determine if the landscape element follow ordinances of the area. For example, the user 202 may wish to add a fence to his backyard. However, the home owners' association may only allow for a specific color, size, or material for the fence.

Dimensional data 528 provides the system an indication of the size of the landscape area the user 202 captures. In this way, the system may determine the appropriate size and number of landscape elements for the particular landscape area, such as the boundary lines or property lines for the landscape area. For example, the system may recognize that a large pool, tree, or other landscape element may not fit into a landscape area, thus those larger landscape elements may not be included as a recommended landscape element for the landscape area. The system may not only recognize the location for individual landscape elements, but also for a group of landscape elements. For example, the user 202 may wish to place a vegetable garden in his/her yard. Therefore the dimensional data 528 may aid the system in determining an appropriate location for the vegetable garden. Dimensional data 528 may also provide a determination as to the appropriate spacing of landscape elements. For example, if the user 202 wishes to plant several trees, the system may recognize that spacing the trees two feet apart may look acceptable to the user 202 now, but as the trees grow, the two foot spacing will not be adequate. In this way, the system may allow the user to visualize a landscape area and proposed landscape area as it currently looks as well as in the future.

Water and hardscape data 529 include land water features and hardscape features that may be in the landscape area. Land water features include depressions in the land where water may collect or high spot in the landscape area where the soil is dryer. In this way, the land water features of the landscape area may provide an indication to which landscape elements may be placed in different positions in the landscape area. For example, if a bush needs a lot of water, the system may recommend placing the bush in a depression in the landscape area such that the bush may receive extra water. Hardscape features include where the user 202 may have installed a rock retaining wall, driveway, gravel, etc. such that those areas may not be suitable for many landscape elements.

Sun/shade data 530 is an analysis of the possible locations to position landscape elements within the landscape area with respect to how much sun or shade that location gets within the landscape area. Different locations within the landscape area may have full sun, partial sun, or full shade depending on the location's position within the landscape area. In this way, the system may determine which landscape elements are appropriate within a specific location of the landscape area based on the amount of sun the location gets. For example, if a location within the landscape area gets full sun, a landscape element that requires full sun to reach its maximum potential will be recommended to be placed in that location. Sun/shade data 530 may also help the system predict if alternative energy sources such as solar panels or the like are a valid option for the user 202.

Climate range 531 includes the range of temperatures that the landscape area will experience throughout the year. The change in temperatures will affect some landscape elements adversely, thus the landscape elements may not reach their maximum potential.

Slope and topography data 532 provides an indication as to the elevation changes within the landscape area. For example, if the landscape area is below sea level, it may get be in a wet environment that may be in a position to be flooding.

Prevailing winds data 533 analyzes the prevailing winds of the landscape area to determine if the landscape elements are able to withstand winds within the region. For example, heavier patio furniture may be recommended to a user 202 who is near the coast line, where there are constant, stronger winds, than the patio furniture recommended for a landscape area that is protected from the winds by mountains. Prevailing winds data 533 may also help the system predict if alternative energy sources such as wind power or the like are a valid option for the user 202.

Rain fall data 534 includes the average rain fall in an area per year. Some landscape elements such as desert plants require little rain fall to reach its potential growth, where as others require several inches of rain fall a year to reach its potential growth.

The system reviews the existing landscape 535, if any, to reveal landscape elements that the user 202 may like in the past, so as to incorporate those (or similar thereto) landscape elements into the new landscape design. Existing landscape 535 may also include pipelines, irrigation lines, electrical lines, and the like that may be running under the ground of the landscape area.

The existing landscape 535 may also provide the system with an indication as to insects, animals, or the like which may harm the growth or functionality of the landscape elements. For example, the system may recognize a landscape element, such as a bush, that has leaves falling from it. The system may determine whether the leaves falling from the bush is a natural occurrence or if the leaves falling from the bush are caused by an invasive insect. If an insect is responsible, the system may recommend a pesticide or the like to treat the bush with, such that the insect will no longer disturb the bush. In some embodiments, the system may also provide an attractant for animals. In this way, the system may recommend bird feeders, butterfly feeders, or the like, such that the landscape area may attract more animals.

Landscape styles 536 include user 202 desired landscape styles such as formal, informal, Tuscan, Italian, Mediterranean, English garden, topical, Asian, contemporary, desert, and/or xeriscape styles. Landscape styles 536 may also include styles from specific designers, television shows, or landscape architects. For example, a user 202 may like a particular famous garden, such as one in Central Park or at the Biltmore Estate. Based on the landscape architect of that garden, the system may provide similar landscape elements.

These factors are analyzed with respect to the landscape area and landscape elements. The directory comprises databases, as mentioned above, that have information relating to a verity of landscape elements. The databases contain information about the landscape elements with respect to the factors. Thus, the system may determine the factors associated with the user's 202 landscape area and subsequently select landscape elements that match those factors. A match between the landscape area of the user 202 and the landscape elements 202 of the database provides the method of recommending landscape element positions within the landscape area by the system.

As further detailed in FIG. 5, once the factors are analyzed for providing a recommended landscape element into a landscape area in block 512, in decision block 514, a determination is made as to whether the mobile device is still capturing video stream of the landscape area or landscape elements. If no video stream is being captured then no indicator is presented in block 516. If a video stream is still being captured, then in block 518 indicators are continuing to be presented with respect to the landscape elements within the landscape area. The indicators are associated with a landscape element the user 202 may visualize in a virtual landscape area environment. In some embodiments, the virtual landscape area environment may be in current time. In some embodiments, the system may provide the virtual landscape area environment in future time. In this way, the user 202 may visualize the potential growth of landscape elements over a period of several years. In yet other embodiments, the virtual landscape area environment may be captured and the system may allow the user 202 to communicate the captured image via social networking, email, texting, or the like such that friends, family, and other individuals may vote whether they "like" or "dislike" the landscaped area. In some embodiments, the user 202 may select the indicator. The selected indicator may allow the user 202 to obtain further detail about the landscape elements recommended for the landscape area in block 520. In some embodiments, selecting the indicator allows the user 202 to position the element in other locations within the landscape area. In yet other embodiments, the user 202 may be provided an offer to purchase the landscape elements recommended by the system when an indicator is selected.

If the user 202 selects the indicator in block 520, the user 202 may be provided further detail about the landscape elements with respect to the landscape areas, such as the properties of the landscape elements. For example, the detailed information for the landscape elements may include the properties of the landscape elements. The properties of the landscape elements may include any aspects that allow the landscape element to reach its maximum potential (whether that be growth, long life, etc.). For example, a flower may require full sun, therefore full sun may be required for the flower to meet its maximum potential.

If the user 202 selects the indicator in block 520, the user 202 may also have the option of moving the landscape element within the virtual landscape area. In this way, the user 202 may view the landscape element in different positions within the landscape area so that he may make a determination of where he likes the landscape element positioned. The system may also provide a percentage of maximum potential for the landscape element when the user 202 moves the element to a different location. For example, the system may recommend a bush that requires shade and a lot of water in a position on the landscape area that has shade and a depression (such that a large amount of water is present). However, if the user 202 moves the bush to a high spot in the landscape area that also receives full sun, the bush may not reach its maximum potential. The system may recognize that there is only a fifty percent change the bush will survive to reach its maximum potential, thus the system will provide the user 202 with that information.

As further illustrated in FIG. 5 at block 522 a user 202 may purchase a landscape element that has been recommended by the system when the user 202 selects the indicator associated with the landscape element. In this way, the user 202 may add the landscape element to his/her landscape area.

FIG. 6 illustrates a process map for providing landscape information using a real-time video stream 600. At block 602 the user 202 enters a store and approaches a landscape element. The landscape element may be viewed when a user 202 enters a retailer or a business and approaches a landscape element. The user 202 may then point his mobile device at the landscape element in the retail store or business, as shown in block 604.

At block 606 the user 202 may capture images of the landscape elements in a retail store or business, as part of a real-time video stream. In some embodiments, the user 202 may point his mobile device at a landscape element, such as trees, flowers, bushes, rocks, bricks, pools, decking, furniture, mulch, etc. These landscape elements may in a retail store, a business, on television, on the internet, or the like. Similar to above with respect to FIG. 5, once the user has captured images, the system may receive the information associated with the image 608. Once the server application 224 or mobile device 204 receives the information associated with the image, a comparison of the information from the image to identifying data, or a directory, stored in the memory device is performed, as illustrated in block 610. The directory may determine the landscape element in the image, from the information sent to the system. The directory may include manually inputted landscape elements.

Manual inputs may be provided by the user 202 through the use of an interface, social networking site, by other selection methods which may include, but are not limited to sending a communication via email, text, voice message, video message/conference, or like means of selecting an opt-in function. The user 202 may opt-in to using an interface, such as a selection interface 700, such as illustrated in FIG. 7.

FIG. 7 illustrates a selection interface 700 in accordance with some embodiments of the invention. If the user 202 has opted-in for manual input of landscape elements, the user 202 may provide the landscape elements to the directory. Manually inputted landscape elements may include landscape element favorites of the user 202. In one embodiment, manually inputted landscape elements may be provided to the directory by the user 202 or individual associated with the user by an interface, such as the selection interface 700.

The selection interface 700 may be provided to the mobile device of the user 202 by the server application 224. The user 202 may access the interface in any means he would typically access the system or the Internet. FIG. 7 provides one embodiment of a selection interface that allows a user 202 to opt-in to provide manually inputted landscape elements for consideration within the user's 202 landscape area. The real-time video image server 208 receives a request from a user 202 to manually input landscape elements.

The user 202 may provide landscape elements he/she wishes to consider in his/her landscape area within the select landscape element section 702. In the select landscape element section 702 the user 202 may find landscape elements that he/she wishes to incorporate into his/her landscape area. In the landscape element section 704, the user 202 may search for landscape elements within a category of landscape elements listed. The landscape element categories include vegetation 710, furniture 712, entertainment 714, and other 716.

If the user 202 is searching for a landscape element, the user 202 may select a category from which to search for the landscape element in the landscape element section 704. Once the user 202 has selected a category, for example the vegetation category 710, the user 202 may select the method of searching from the find landscape element section 706. The methods of searching for a landscape element include the Internet 718, a captured image 720 or from a retail store 722. If the user selects the Internet 718, the user 202 is directed to a search engine to search for the landscape element. For example, if the user 202 is looking for a specific type of Oak tree, the user 202 may input the type of Oak tree into the search engine to find that specific Oak tree. The user 202 may then add the Oak tree to his/her directory by selecting the add button.

If the user 202 has previously captured an image of a landscape element from one of the categories, the user 202 may select the category and up-load the image. In this way, the system may incorporate that landscape element into the landscape area of the user 202. The capturing of an image may have occurred using the mobile device, a computer, camera, or the like.

The user 202 may also search retailers for landscape items in section 722. Retailers may include a retail store, a business, a website of a retailer or business, or the like. For example, a user 202 may be in a retail store that carries landscape elements. The user 202 may see a landscape element that he/she would like to include in his landscape area. Therefore, the user 202 may capture the landscape element and store it in the directory for positioning in his landscape area.

Once the user 202 has found the landscape elements desired, the user 202 may add the landscape elements to a directory for the system to incorporate the landscape elements into the user's 202 landscape area. In some embodiments, the system is able to position the element in the user's 202 landscape area immediately. For example, if the user 202 captures an image of a landscape element at a retail store, the system may instantly position the element within the user's 202 landscape area. In this way, the user 202 may have a virtual image of his/her landscape area with the landscape element, so that the user 202 may decide if he/she wishes to purchase that landscape element at the retailer.

Adding landscape elements from the directory may be done by the user 202 in the landscape area section 708 of the selection interface 700. In the landscape area section 708 the user 202 may select the landscape area to add the element to in section 724. For example, a user 202 may have multiple landscape areas he is landscaping. For example, the user 202 may be a landscape designer and have several clients in which he/she is currently designing landscape for. In this way, the user 202 may select which landscape area he/she would like to add a landscape element to in section 724. In section 724 the user 202, in this example, has three areas to select from, area 1, area 2, and area 3. Once the user 202 has selected a landscape area to include the landscape element in, the user 202 may select the location of the landscape element in section 726. In this way, the user 202 may move the landscape element to the location within the landscape area that he/she would like the landscape element to be positioned. The system will provide a recommendation to the user 202 as to the most appropriate location for the landscape element, but the user 202 may position the element any location he/she desires.

After the user 202 has selected the landscape element and positioned the landscape element in the desired location within the landscape area, the user 202 may purchase the landscape element in section 728. If the user 202 found the landscape element online, at a retail store, in a magazine, in a showroom, or the like the system will find the landscape element or a similar landscape element and provide a link for the user 202 to purchase the landscape element. The system may directly connect with the user's 202 financial institution to provide an easy payment method for the user 202. Once the user 202 has completed using the selection interface 700 the user 202 may select the finished button 730 so that the system may store the manual inputs from the user 202.

Using the selection interface 700 or other means, the user 202 may provide manually inputted landscape elements that the user 202 may wish to include in to his landscape area. The user 202 may add these landscape elements at any time convenient to the user 202. Landscape elements may also be provided by the user 202 through social networks the user 202 may subscribe to.

Returning to FIG. 6, after the system has received a captured image of a landscape element or the user 202 has provided manual input, factors of the landscape area are analyzed to determine a recommended location of the landscape elements in block 612. Once the factors are analyzed for providing a recommended landscape element into a landscape area in block 612, in decision block 614, a determination is made as to whether the mobile device 204 is still capturing video stream of the landscape elements. If no video stream is being captured then no indicator is presented in block 616. If a video stream is still being captured, then in block 618 indicators are continuing to be presented with respect to the landscape elements. The indicators are associated with a landscape element the user 202 may visualize in a virtual landscape area environment. In some embodiments, the user 202 may select the indicator. The selected indicator may allow the user 202 to obtain further detail about the landscape element the user 202 manually inputted and how the details of the landscape element relate to the user's 202 landscape area in block 620.

If the user 202 selects the indicator in block 620, the user 202 may have the option of purchasing the landscape element in block 622. The indicator may provide the user 202 with the best price of the landscape element. For example, the user 202 may be at a retail store, but the indicator may provide the user 202 with an offer to purchase the same landscape element for a discounted rate as compared to the retail store. Therefore, the user 202 may elect to purchase the landscape element from the indicator instead of the retail store. Furthermore, the system may provide the user 202 with a direct link to the user's 202 financial institution, so that if the user 202 chooses to purchase the landscape element, the user 202 may do so without communicating a payment method.

In some embodiments, if the user 202 selects the indicator in block 620, the system may recommend the user 202 not to purchase the landscape element. The system may analyze the landscape element selected compared to the landscape area of the user 202 and determine that the landscape element does not match the landscape area. Therefore, the system may recommend the user 202 not purchase the landscape element. If this occurs, the system may provide the user 202 with other alternative landscape elements that are similar to the selected landscape element that may match the user's 202 landscape area.

In various embodiments, information associated with or related to one or more objects that is retrieved for presentation to a user via the mobile device may be permanently or semi-permanently associated with the object. In other words, the object may be "tagged" with the information. In some embodiments, a location pointer is associated with an object after information is retrieved regarding the object. In this regard, subsequent mobile devices 204 capturing the object for recognition may retrieve the associated information, tags and/or pointers in order to more quickly retrieve information regarding the object. In some embodiments, the mobile device 204 provides the user an opportunity to post messages, links to information, or the like and associate such postings with the object. Subsequent users 202 may then be presenting such postings when their mobile devices 204 capture and recognize an object. In some embodiments, the information gathered through the recognition and information retrieval process may be posted by the user 202 in association with the object. Such tags and/or postings may be stored in a predetermined memory and/or database for ease of searching and retrieval.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

Thus, methods, systems, computer programs and the like have been disclosed that provide for using real-time video analysis, such as AR or the like to assist the user of mobile devices with commerce activities. Through the use real-time vision object recognition objects, logos, artwork, products, locations and other features that can be recognized in the real-time video stream can be matched to data associated with such to assist the user with commerce activity. The commerce activity may include, but is not limited to; conducting a transaction, providing information about a product/service, providing rewards based information, providing user-specific offers, or the like. In specific embodiments, the data that matched to the images in the real-time video stream is specific to financial institutions, such as user financial behavior history, user purchase power/transaction history and the like. In this regard, many of the embodiments herein disclosed leverage financial institution data, which is uniquely specific to financial institution, in providing information to mobile devices users in connection with real-time video stream analysis.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The systems, methods, computer program products, etc. described herein, may be utilized or combined with any other suitable AR-related application. Non-limiting examples of other suitable AR-related applications include those described in the following U.S. Provisional patent applications, the entirety of each of which is incorporated herein by reference:

| U.S. Provisional Ser. No. | Filed On | Title |
| --- | --- | --- |
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |
| 61/478,393 | Apr. 22, 2011 | Real-Time Image Analysis for Medical Savings Plans |
| 61/478,397 | Apr. 22, 2011 | Providing Data Associated With Relationships Between Individuals and |

-continued

| U.S. Provisional Ser. No. | Filed On | Title |
|---|---|---|
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |

What is claimed is:

1. A method for providing landscaping design recommendations, the method comprising:
receiving a captured image of a landscape area for the landscape design;
building a directory of data relating to the landscape area, wherein the directory comprises information regarding various locations within the landscape area, the information based on natural characteristics of each of the various locations within the landscape area;
receiving information about a product to be incorporated into the landscape area, wherein the information is received from a mobile device;
matching the information about the product to be incorporated into the landscape area with the directory of data relating to the various locations within the landscape area, through the use of a processing device, wherein the matching of the product with the various locations within the landscape area is based at least in part on a match of the natural characteristics of one of the various locations within the landscape area and the natural characteristics of the product to be incorporated into the landscape area; and
presenting the products to be incorporated into the landscape area and indicators associated with the products in a real-time video stream on a mobile device, in a recommended location within the landscape area, the recommended location is based at least in part on the matching of information about the natural characteristics of the product to be incorporated into the landscape area with the directory of data relating to the natural characteristics of each of the various locations within the landscape area, wherein presenting the products to be incorporated into the landscape area and the indicators associated with the products comprises superimposing the products to be incorporated into the landscape area and the indicators associated with the products over real-time video that is being captured by the mobile device of the landscape area, wherein the location of the products within the landscape area correspond to the recommended locations determined by the matching of information about the natural characteristics of the product to be incorporated into the landscape area with the directory of data relating to the natural characteristics of each of the various locations within the landscape area.

2. The method of claim 1, wherein the directory comprises natural characteristic information regarding geographic location indications within the landscape area.

3. The method of claim 1, wherein the directory further comprises natural characteristic information regarding geological information of the landscape area.

4. The method of claim 1, wherein the directory further comprises natural characteristic information regarding weather data of the landscape area.

5. The method of claim 1, wherein the receiving product information comprises manually inputted list data, wherein the list data indicates user products preferences.

6. The method of claim 1, wherein the receiving information about the product comprises real-time imaging of a product.

7. The method of claim 1, wherein presenting an indicator associated with the product comprises displaying the indicator on a display of the mobile device.

8. The method of claim 1, wherein presenting an indicator associated with the product comprises superimposing the indicator over real-time video that is captured by the mobile device.

9. The method of claim 1, wherein the indicator is selectable by the user.

10. The method of claim 1, wherein the indicator, upon being selected, provides information about the product and the natural characteristics of the product compared to the natural characteristics of the location within the landscape area.

11. The method of claim 1, wherein matching the product with the directory of data relating to the landscape area further comprises determining a location for the product within the landscape area, wherein the location for the product within the landscape area is the location the product is going to thrive, based at least in part on the natural characteristics of the product and the landscape area.

12. The method of claim 1, wherein the product is a landscape design element.

13. A system for providing landscaping design recommendations, comprising:
a memory device;
a communication device;
a processing device operatively coupled to the memory device and the communication device, wherein the processing device is configured to execute computer-readable program code to:
receive a captured image of a landscape area for the landscape design;

build a directory of data relating to the landscape area, wherein the directory comprises information regarding various locations within the landscape area, the information based on natural characteristics of each of the various locations within the landscape area;

receive information about a product to be incorporated into the landscape area, wherein the information is received from a mobile device;

match the information about the product to be incorporated into the landscape area with the directory of data relating to the various locations within the landscape area, through the use of a processing device, wherein the matching of the product with the various locations within the landscape area is based at least in part on a match of the natural characteristics of one of the various locations within the landscape area and the natural characteristics of the product to be incorporated into the landscape area; and present the products to be incorporated into the landscape area and indicators associated with the products in a real-time video stream on a mobile device, in a recommended location within the landscape area, the recommended location is based at least in part on the matching of information about the natural characteristics of the product to be incorporated into the landscape area with the directory of data relating to the natural characteristics of each of the various locations within the landscape area, wherein presenting the products to be incorporated into the landscape area and the indicators associated with the products comprises superimposing the products to be incorporated into the landscape area and the indicators associated with the products over real-time video that is being captured by the mobile device of the landscape area, wherein the location of the products within the landscape area correspond to the recommended locations determined by the matching of information about the natural characteristics of the product to be incorporated into the landscape area with the directory of data relating to the natural characteristics of each of the various locations within the landscape area.

14. The system of claim 13, wherein the directory comprises natural characteristic information regarding geographic location indications within the landscape area.

15. The system of claim 13, wherein the directory further comprises natural characteristic information regarding geological information of the landscape area.

16. The system of claim 13, wherein the directory further comprises natural characteristic information regarding weather data of the landscape area.

17. The system of claim 13, wherein the receiving product information comprises manually inputted list data, wherein the list data indicates user products preferences.

18. The system of claim 13, wherein the receiving information about the product comprises real-time imaging of a product.

19. The system of claim 13, wherein presenting an indicator associated with the product comprises displaying the indicator on a display of the mobile device.

20. The system of claim 13, wherein presenting an indicator associated with the product comprises superimposing the indicator over real-time video that is captured by the mobile device.

21. The system of claim 13, wherein the indicator is selectable by the user.

22. The system of claim 13, wherein the indicator, upon being selected, provides information about the product and the natural characteristics of the product compared to the natural characteristics of the location within the landscape area.

23. The system of claim 13, wherein matching the product with the directory of data relating to the landscape area further comprises determining a location for the product within the landscape area, wherein the location for the product within the landscape area is the location the product is going to thrive, based at least in part on the natural characteristics of the product and the landscape area.

24. A computer program product for providing landscaping design recommendations, the computer program product comprising at least one non-transitory computer-readable medium having computer-readable program code portions embodied therein, the computer-readable program code portions comprising:

an executable portion configured for receiving a captured image of a landscape area for the landscape design;

an executable portion configured for building a directory of data relating to the landscape area, wherein the directory comprises information regarding various locations within the landscape area, the information based on natural characteristics of each of the various locations within the landscape area;

an executable portion configured for receiving information about a product to be incorporated into the landscape area, wherein the information is received from a mobile device;

an executable portion configured for matching the information about the product to be incorporated into the landscape area with the directory of data relating to the various locations within the landscape area, through the use of a processing device, wherein the matching of the product with the various locations within the landscape area is based at least in part on a match of the natural characteristics of one of the various locations within the landscape area and the natural characteristics of the product to be incorporated into the landscape area; and an executable portion configured for presenting the products to be incorporated into the landscape area and indicators associated with the products in a real-time video stream on a mobile device, in a recommended location within the landscape area, the recommended location is based at least in part on the matching of information about the natural characteristics of the product to be incorporated into the landscape area with the directory of data relating to the natural characteristics of each of the various locations within the landscape area, wherein presenting the products to be incorporated into the landscape area and the indicators associated with the products comprises superimposing the products to be incorporated into the landscape area and the indicators associated with the products over real-time video that is being captured by the mobile device of the landscape area, wherein the location of the products within the landscape area correspond to the recommended locations determined by the matching of information about the natural characteristics of the product to be incorporated into the landscape area with the directory of data relating to the natural characteristics of each of the various locations within the landscape area.

25. The computer program product of claim 24, wherein the directory comprises natural characteristic information regarding geographic location indications within the landscape area.

26. The computer program product of claim 24, wherein the directory further comprises natural characteristic information regarding geological information of the landscape area.

27. The computer program product of claim 24, wherein the directory further comprises natural characteristic information regarding weather data of the landscape area.

28. The computer program product of claim 24, wherein the receiving product information comprises manually inputted list data, wherein the list data indicates user products preferences.

29. The computer program product of claim 24, wherein the receiving information about the product comprises real-time imaging of a product.

30. The computer program product of claim 24, wherein presenting an indicator associated with the product comprises displaying the indicator on a display of the mobile device.

31. The computer program product of claim 24, wherein presenting an indicator associated with the product comprises superimposing the indicator over real-time video that is captured by the mobile device.

32. The computer program product of claim 24, wherein the indicator is selectable by the user.

33. The computer program product of claim 24, wherein the indicator, upon being selected, provides information about the product and the natural characteristics of the product compared to the natural characteristics of the location within the landscape area.

34. The computer program product of claim 24, wherein matching the product with the directory of data relating to the landscape area further comprises determining a location for the product within the landscape area, wherein the location for the product within the landscape area is the location the product is going to thrive, based at least in part on the natural characteristics of the product and the landscape area.

* * * * *